US012610277B2

(12) United States Patent
 Katar et al.

(10) Patent No.: US 12,610,277 B2
(45) Date of Patent: Apr. 21, 2026

(54) BTM-BASED LOAD BALANCING

(71) Applicant: QUALCOMM Incorporated, San Diego, CA (US)

(72) Inventors: Srinivas Katar, Fremont, CA (US); George Cherian, San Diego, CA (US); Abhishek Pramod Patil, San Diego, CA (US); Sai Yiu Duncan Ho, San Diego, CA (US); Alfred Asterjadhi, San Diego, CA (US); Gaurang Naik, San Diego, CA (US); Yanjun Sun, San Diego, CA (US); Abdel Karim Ajami, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 18/176,378

(22) Filed: Feb. 28, 2023

(65) Prior Publication Data

US 2024/0073739 A1     Feb. 29, 2024

Related U.S. Application Data

(60) Provisional application No. 63/373,279, filed on Aug. 23, 2022.

(51) Int. Cl.
 *H04W 28/08* (2023.01)
 *H04W 76/15* (2018.01)
(52) U.S. Cl.
 CPC ........... *H04W 28/08* (2013.01); *H04W 76/15* (2018.02)
(58) Field of Classification Search
 CPC .............................. H04W 28/08; H04W 76/15

USPC .......................................................... 370/329
See application file for complete search history.

(56) References Cited

U.S. PATENT DOCUMENTS

2022/0116830 A1    4/2022  Cariou et al.
2023/0262807 A1*   8/2023  Jiang ..................... H04W 76/15
                                          370/329

FOREIGN PATENT DOCUMENTS

EP        4002899 A1    5/2022

OTHER PUBLICATIONS

International Search Report and Written Opinion—PCT/US2023/070672—ISA/EPO—Nov. 20, 2023.
(Continued)

*Primary Examiner* — Huy C Ho
(74) *Attorney, Agent, or Firm* — Arent Fox Schiff, LLP

(57) ABSTRACT

Aspects are provided for BTM-based load balancing. Various aspects relate generally to a method of load balancing where an AP multi-link device (MLD) recommends that a non-AP MLD move to an indicated set of links of the AP MLD and operate on the indicated set of links without purging context between the AP MLD and the non-AP MLD. In some examples, if the non-AP MLD does not comply, then the non-AP MLD may face disassociation from the AP MLD. Some aspects more specifically relate to recommending that the non-AP MLD move to an indicated set of links of a different AP MLD and operate on the indicated set of links of the different AP MLD after performing a multi-link setup with the different AP MLD. In some examples, the AP MLD may then disassociate from the non-AP MLD.

30 Claims, 21 Drawing Sheets

(56) References Cited

OTHER PUBLICATIONS

Monajemi P (Cisco)., et al., "AP Link Disablement Advertisement", IEEE Draft, 11-22-1023-05-00BE-AP-LINK- Disablement, IEEE-SA Mentor, Piscataway, NJ USA, Vol. 802.11 EHT, 802.11be, No. 5, Jul. 12, 2022, 27 Pages, XP068192775, Section 35.3.7.1.8 Association Procedures for TID-to-link Mapping.

Monajemi P (Cisco)., et al., "CC36 Comment Resolution for Enterprise—Grade TID Mapping", IEEE Draft, 11-21-1793-08-00BE-CC36-CR-FOR-ENTERPRISEGRADE-TID-Mapping, IEEE-SA Mentor, Piscataway, NJ USA, Vol. 802.11 EHT, 802.11be, No. 8, May 16, 2022, 51 Pages, XP068190643, Section "TID to Link Mapping Enhancements".

* cited by examiner

400a

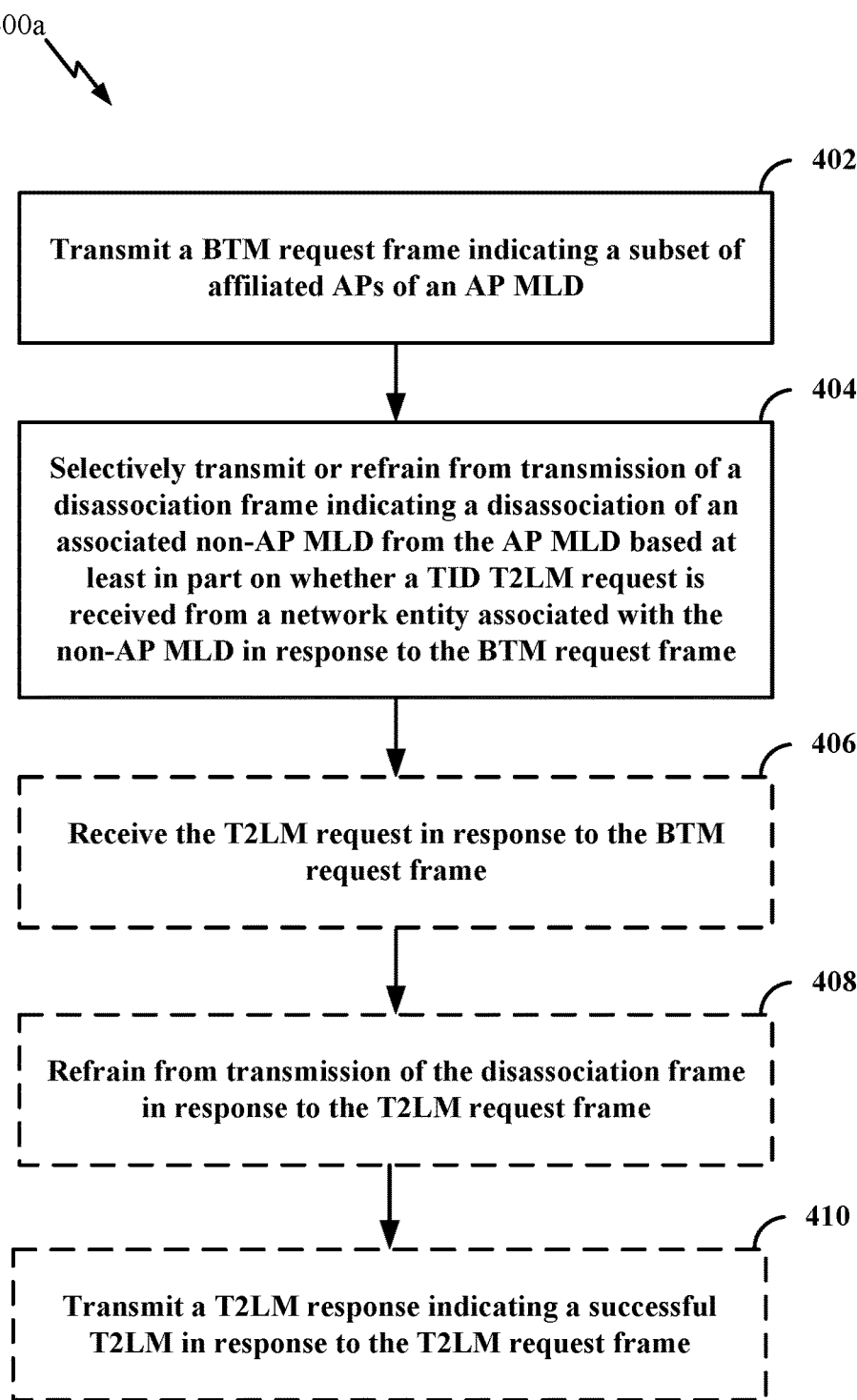

402

Transmit a BTM request frame indicating a subset of affiliated APs of an AP MLD

404

Selectively transmit or refrain from transmission of a disassociation frame indicating a disassociation of an associated non-AP MLD from the AP MLD based at least in part on whether a TID T2LM request is received from a network entity associated with the non-AP MLD in response to the BTM request frame

406

Receive the T2LM request in response to the BTM request frame

408

Refrain from transmission of the disassociation frame in response to the T2LM request frame

410

Transmit a T2LM response indicating a successful T2LM in response to the T2LM request frame

*Figure 4A*

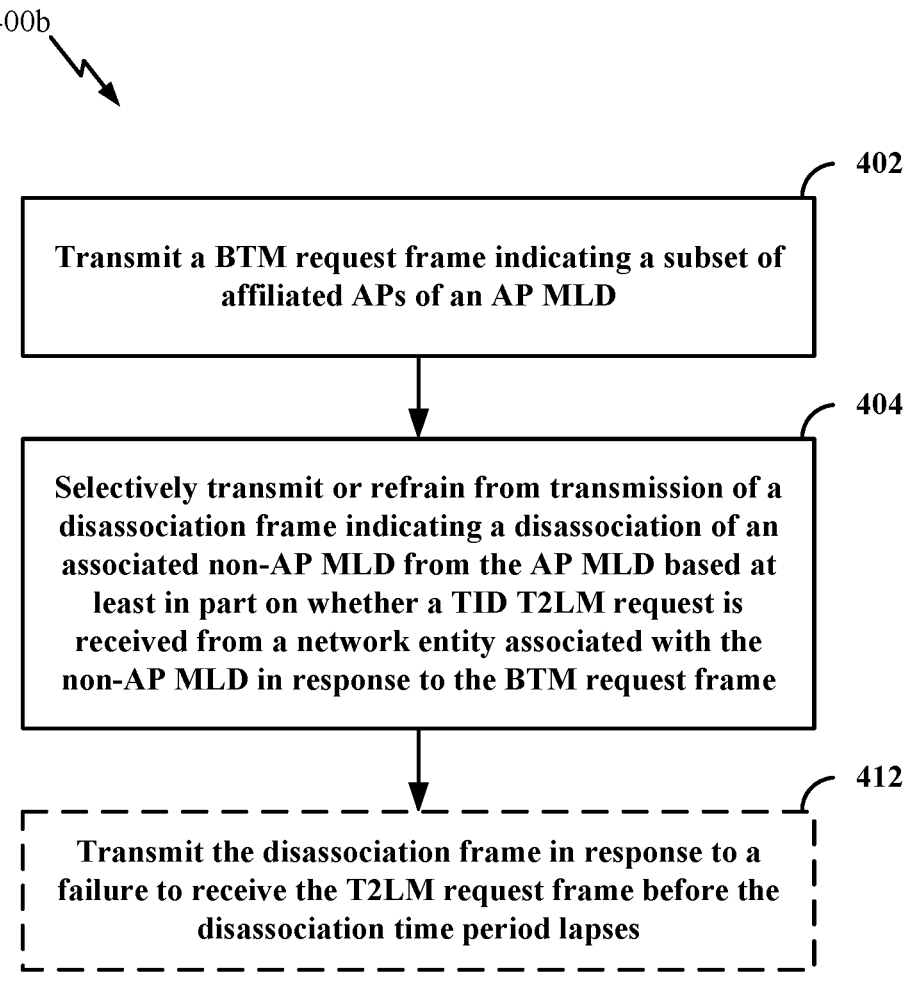

400b

402

Transmit a BTM request frame indicating a subset of affiliated APs of an AP MLD

404

Selectively transmit or refrain from transmission of a disassociation frame indicating a disassociation of an associated non-AP MLD from the AP MLD based at least in part on whether a TID T2LM request is received from a network entity associated with the non-AP MLD in response to the BTM request frame

412

Transmit the disassociation frame in response to a failure to receive the T2LM request frame before the disassociation time period lapses

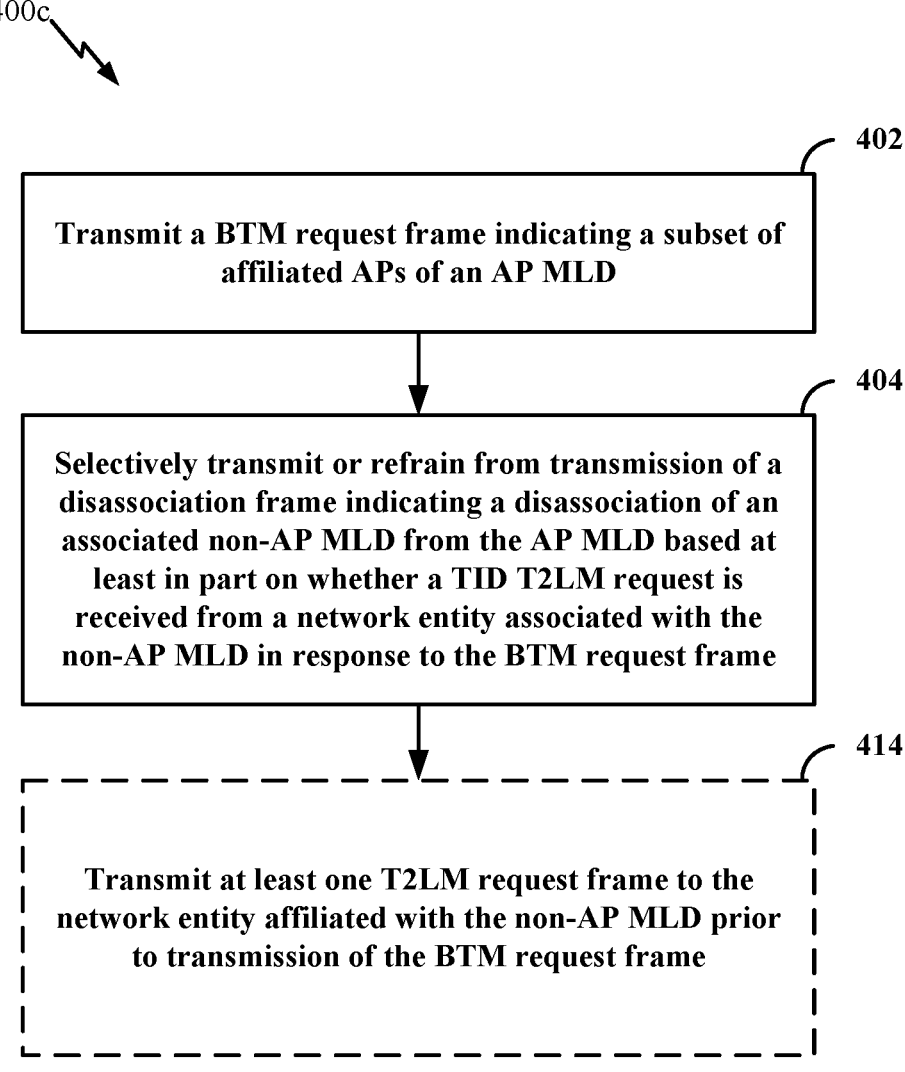

402

Transmit a BTM request frame indicating a subset of affiliated APs of an AP MLD

404

Selectively transmit or refrain from transmission of a disassociation frame indicating a disassociation of an associated non-AP MLD from the AP MLD based at least in part on whether a TID T2LM request is received from a network entity associated with the non-AP MLD in response to the BTM request frame

414

Transmit at least one T2LM request frame to the network entity affiliated with the non-AP MLD prior to transmission of the BTM request frame

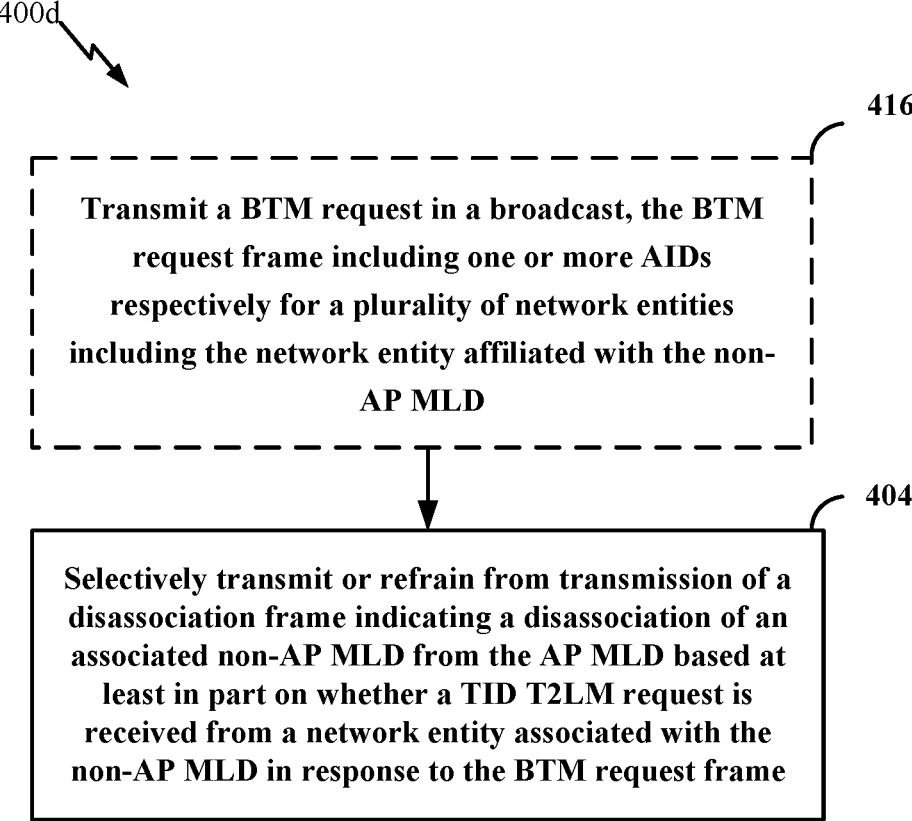

416

Transmit a BTM request in a broadcast, the BTM request frame including one or more AIDs respectively for a plurality of network entities including the network entity affiliated with the non-AP MLD

404

Selectively transmit or refrain from transmission of a disassociation frame indicating a disassociation of an associated non-AP MLD from the AP MLD based at least in part on whether a TID T2LM request is received from a network entity associated with the non-AP MLD in response to the BTM request frame

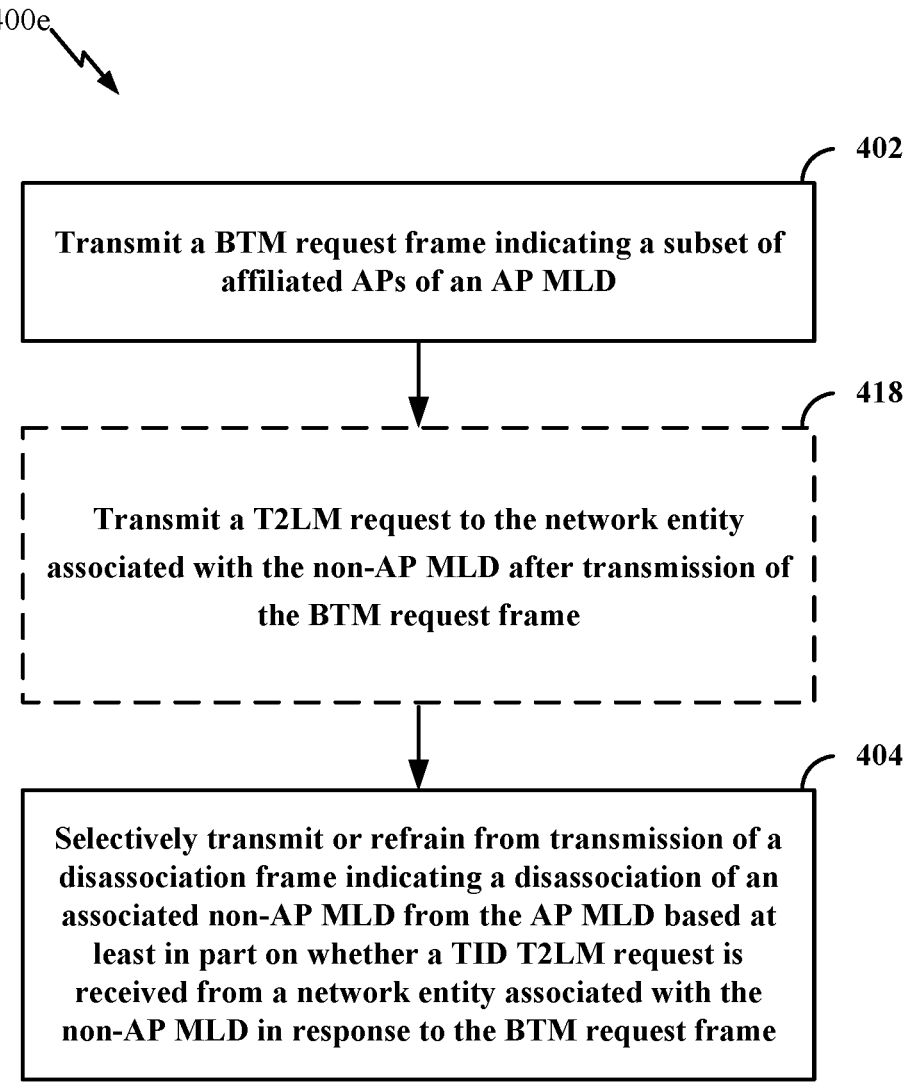

402

Transmit a BTM request frame indicating a subset of affiliated APs of an AP MLD

418

Transmit a T2LM request to the network entity associated with the non-AP MLD after transmission of the BTM request frame

404

Selectively transmit or refrain from transmission of a disassociation frame indicating a disassociation of an associated non-AP MLD from the AP MLD based at least in part on whether a TID T2LM request is received from a network entity associated with the non-AP MLD in response to the BTM request frame

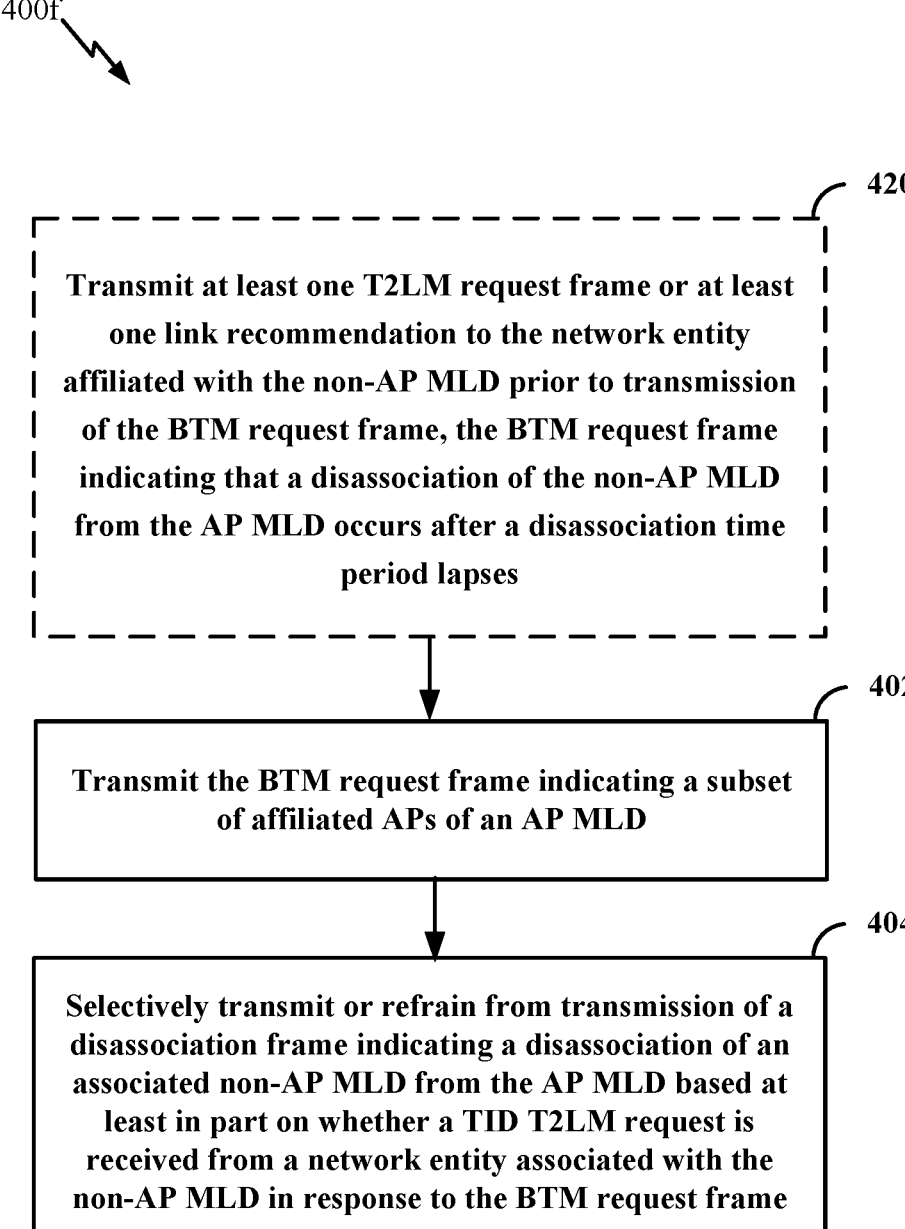

420

Transmit at least one T2LM request frame or at least one link recommendation to the network entity affiliated with the non-AP MLD prior to transmission of the BTM request frame, the BTM request frame indicating that a disassociation of the non-AP MLD from the AP MLD occurs after a disassociation time period lapses

402

Transmit the BTM request frame indicating a subset of affiliated APs of an AP MLD

404

Selectively transmit or refrain from transmission of a disassociation frame indicating a disassociation of an associated non-AP MLD from the AP MLD based at least in part on whether a TID T2LM request is received from a network entity associated with the non-AP MLD in response to the BTM request frame

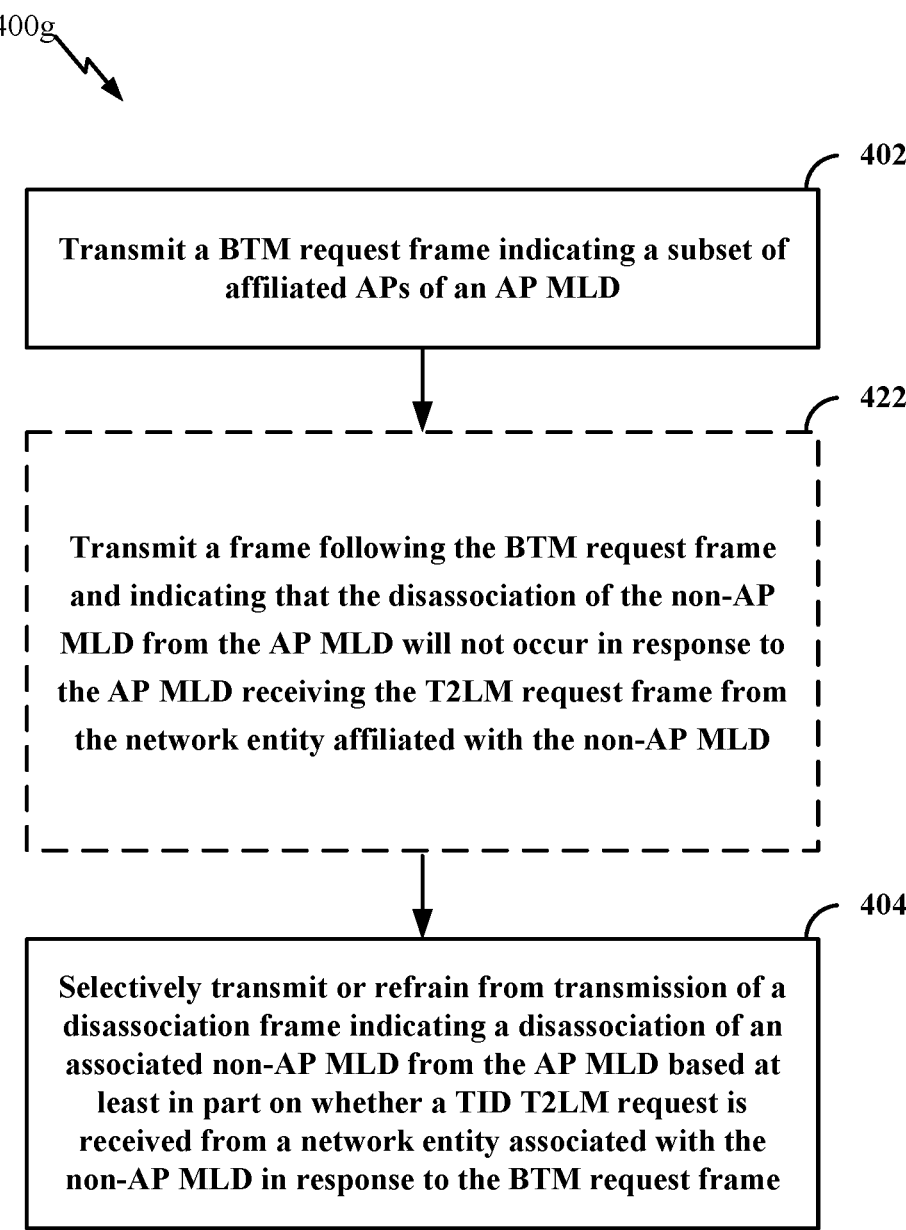

402

Transmit a BTM request frame indicating a subset of
affiliated APs of an AP MLD

422

Transmit a frame following the BTM request frame
and indicating that the disassociation of the non-AP
MLD from the AP MLD will not occur in response to
the AP MLD receiving the T2LM request frame from
the network entity affiliated with the non-AP MLD

404

Selectively transmit or refrain from transmission of a
disassociation frame indicating a disassociation of an
associated non-AP MLD from the AP MLD based at
least in part on whether a TID T2LM request is
received from a network entity associated with the
non-AP MLD in response to the BTM request frame

*Figure 4G*

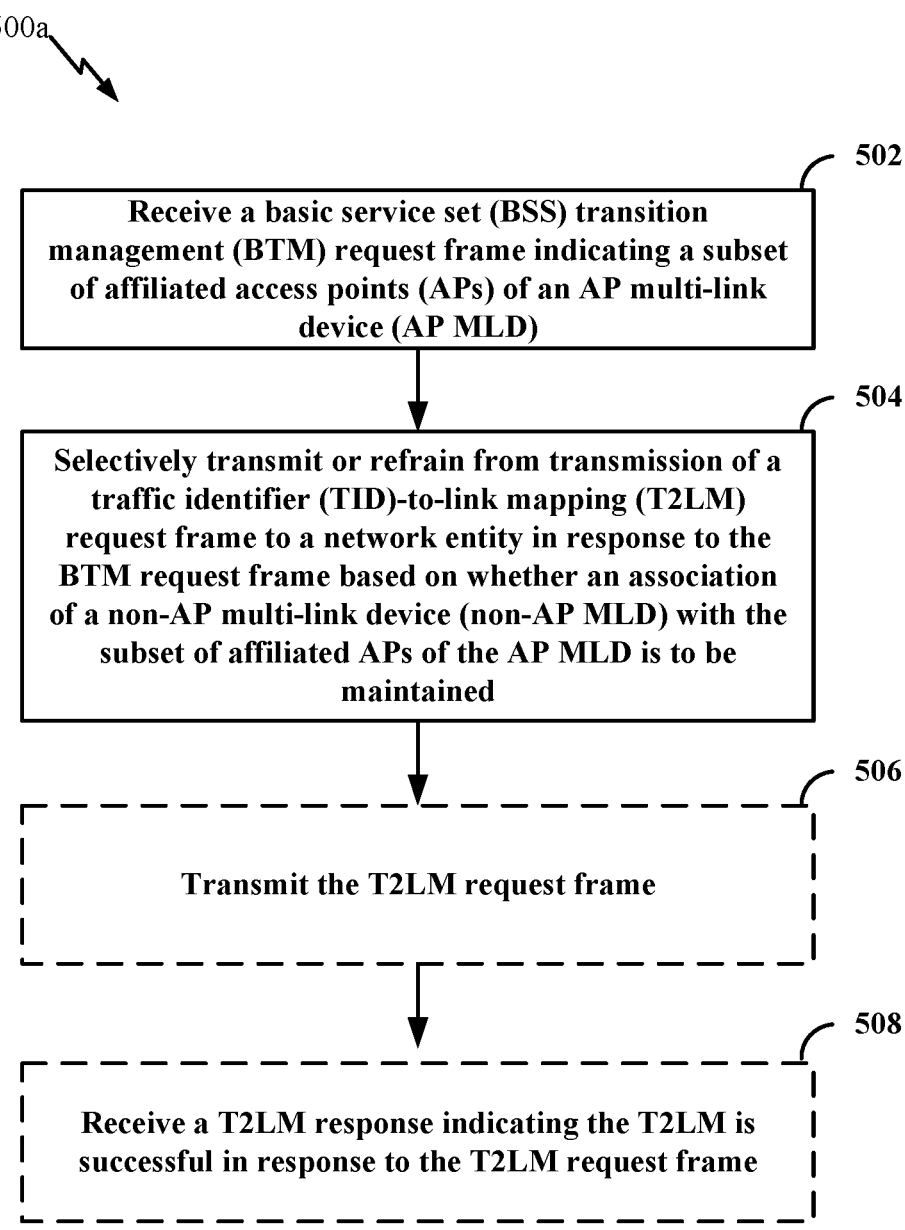

500a

502

Receive a basic service set (BSS) transition management (BTM) request frame indicating a subset of affiliated access points (APs) of an AP multi-link device (AP MLD)

504

Selectively transmit or refrain from transmission of a traffic identifier (TID)-to-link mapping (T2LM) request frame to a network entity in response to the BTM request frame based on whether an association of a non-AP multi-link device (non-AP MLD) with the subset of affiliated APs of the AP MLD is to be maintained

506

Transmit the T2LM request frame

508

Receive a T2LM response indicating the T2LM is successful in response to the T2LM request frame

*Figure 5A*

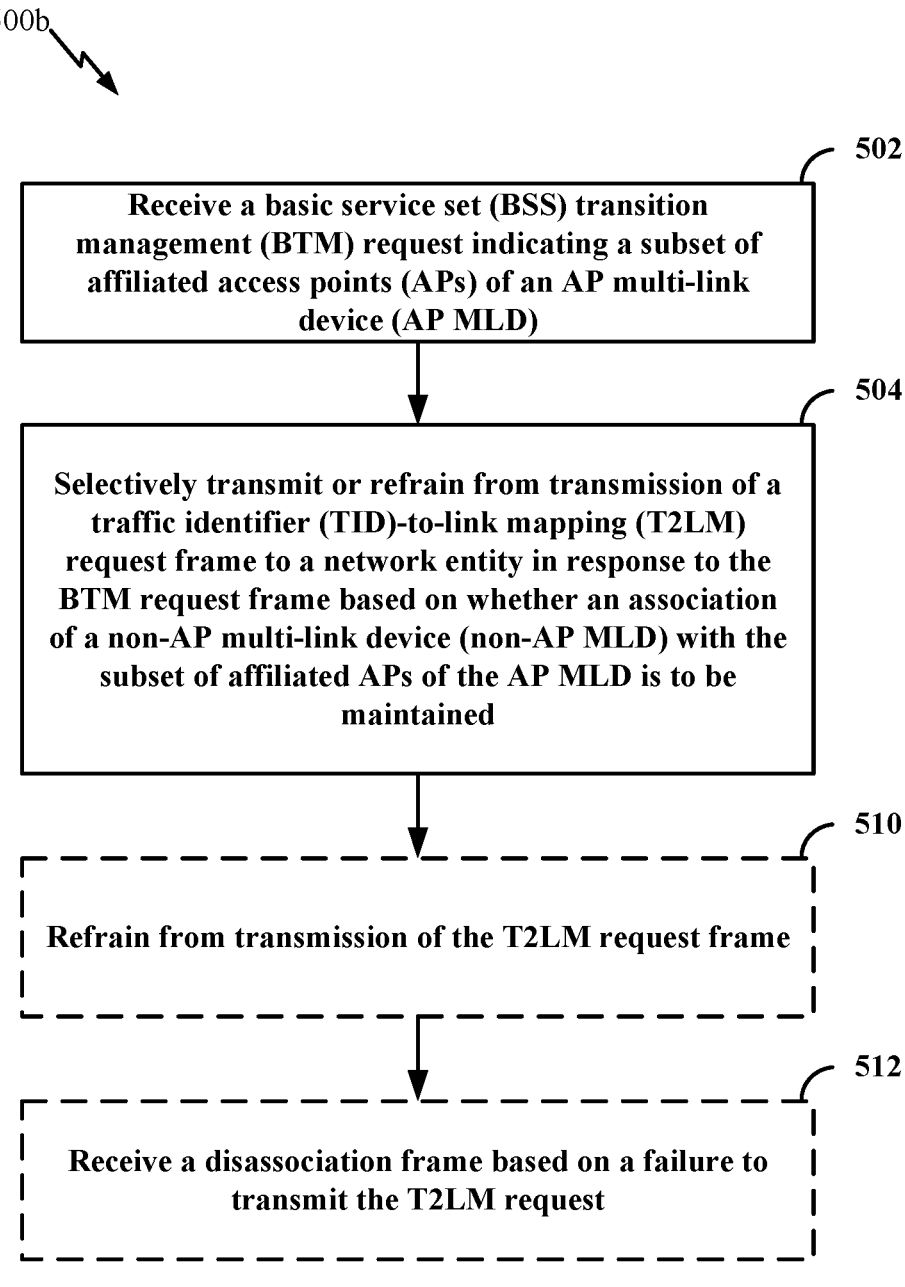

500b

502

Receive a basic service set (BSS) transition management (BTM) request indicating a subset of affiliated access points (APs) of an AP multi-link device (AP MLD)

504

Selectively transmit or refrain from transmission of a traffic identifier (TID)-to-link mapping (T2LM) request frame to a network entity in response to the BTM request frame based on whether an association of a non-AP multi-link device (non-AP MLD) with the subset of affiliated APs of the AP MLD is to be maintained

510

Refrain from transmission of the T2LM request frame

512

Receive a disassociation frame based on a failure to transmit the T2LM request

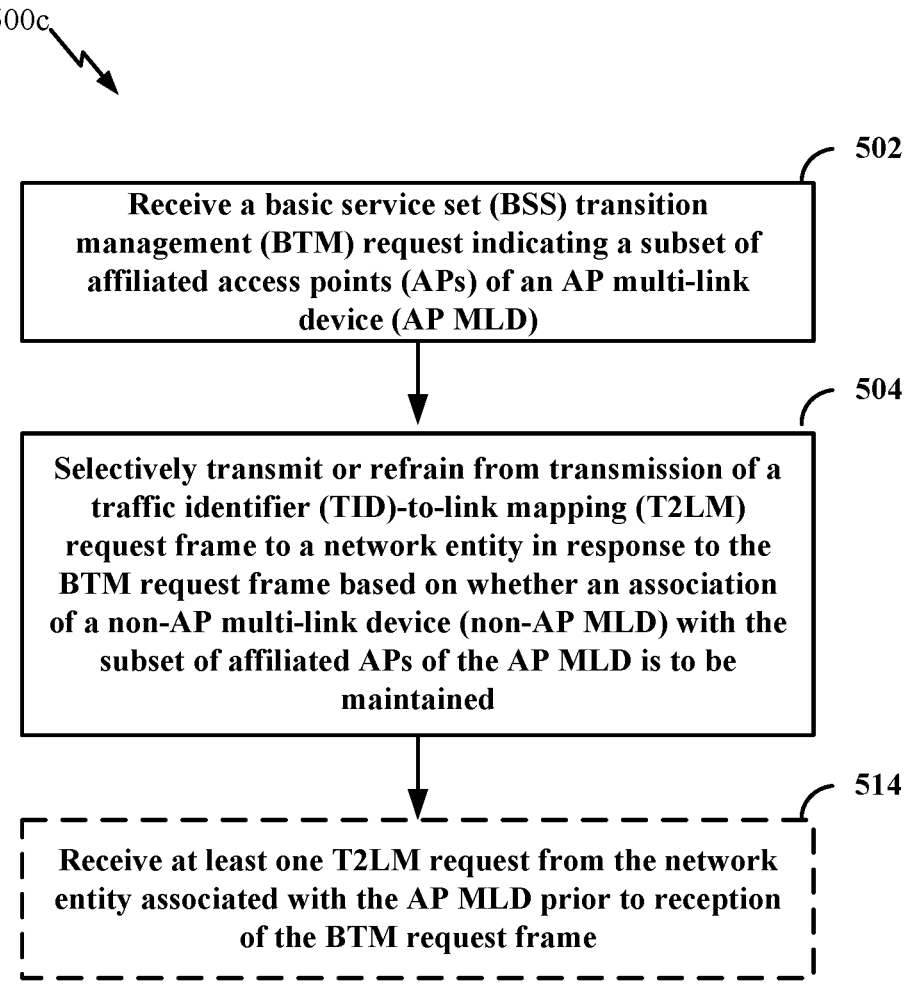

┌─────────────────────────────────────────────────┐  ⌐ 502
│          Receive a basic service set (BSS) transition       │
│       management (BTM) request indicating a subset of       │
│      affiliated access points (APs) of an AP multi-link     │
│                      device (AP MLD)                        │
└─────────────────────────────────────────────────┘

↓

┌─────────────────────────────────────────────────┐  ⌐ 504
│       Selectively transmit or refrain from transmission of a   │
│         traffic identifier (TID)-to-link mapping (T2LM)        │
│        request frame to a network entity in response to the    │
│       BTM request frame based on whether an association        │
│      of a non-AP multi-link device (non-AP MLD) with the       │
│         subset of affiliated APs of the AP MLD is to be        │
│                         maintained                             │
└─────────────────────────────────────────────────┘

↓

┌─ ─ ─ ─ ─ ─ ─ ─ ─ ─ ─ ─ ─ ─ ─ ─ ─ ─ ─ ─ ─ ┐  ⌐ 514
│      Receive at least one T2LM request from the network      │
│    entity associated with the AP MLD prior to reception      │
│                    of the BTM request frame                  │
└─ ─ ─ ─ ─ ─ ─ ─ ─ ─ ─ ─ ─ ─ ─ ─ ─ ─ ─ ─ ─ ┘

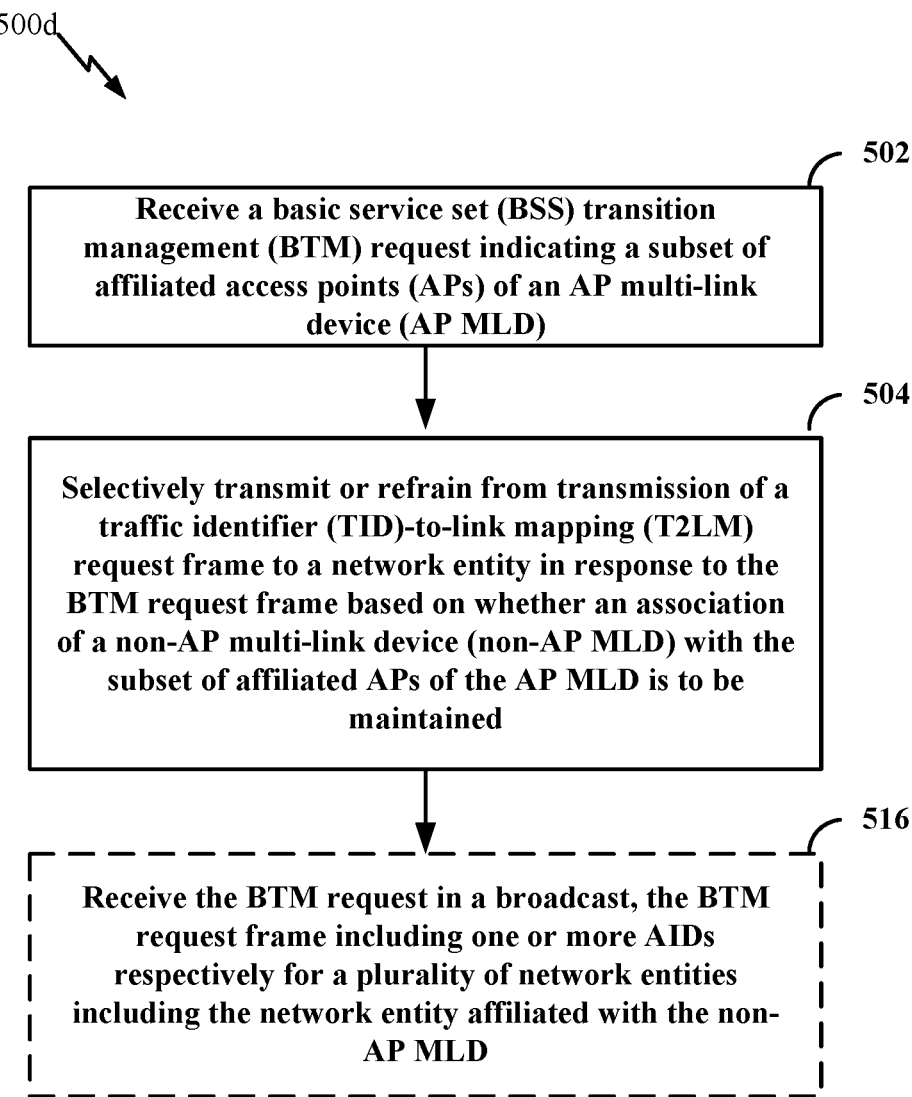

502

Receive a basic service set (BSS) transition management (BTM) request indicating a subset of affiliated access points (APs) of an AP multi-link device (AP MLD)

504

Selectively transmit or refrain from transmission of a traffic identifier (TID)-to-link mapping (T2LM) request frame to a network entity in response to the BTM request frame based on whether an association of a non-AP multi-link device (non-AP MLD) with the subset of affiliated APs of the AP MLD is to be maintained

516

Receive the BTM request in a broadcast, the BTM request frame including one or more AIDs respectively for a plurality of network entities including the network entity affiliated with the non-AP MLD

*Figure 5D*

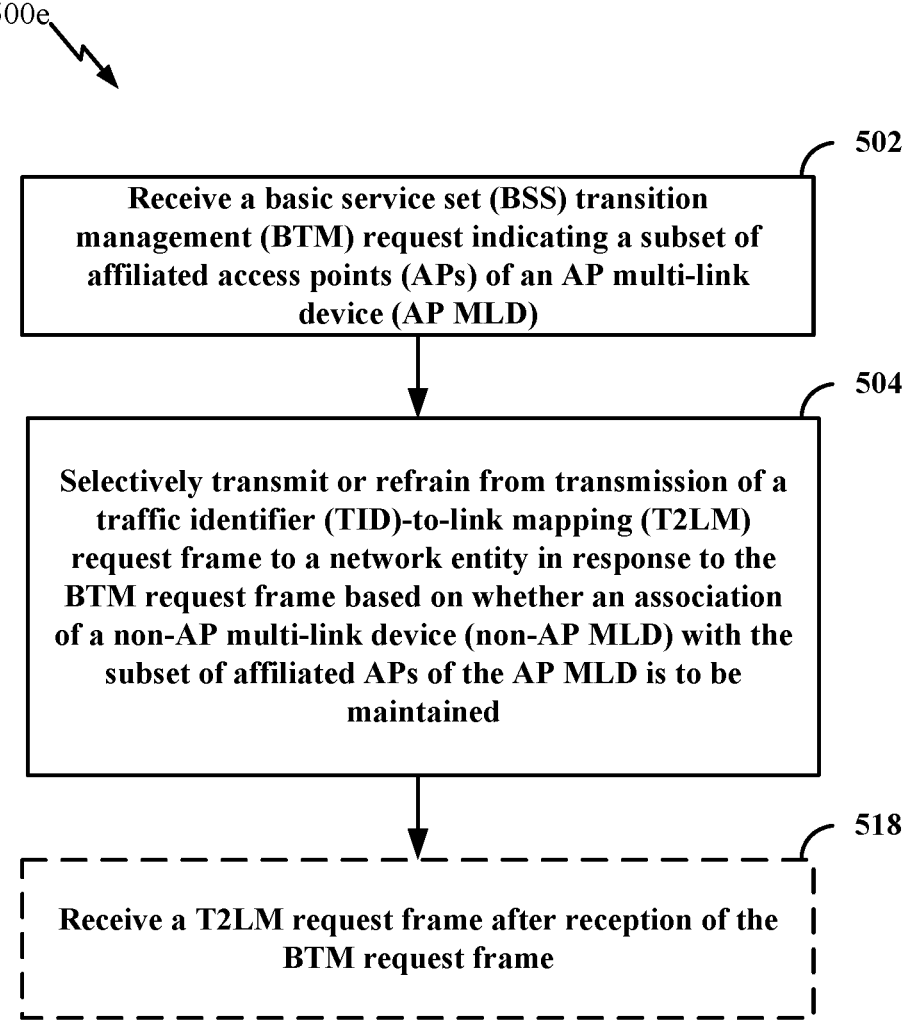

500e

502

Receive a basic service set (BSS) transition management (BTM) request indicating a subset of affiliated access points (APs) of an AP multi-link device (AP MLD)

504

Selectively transmit or refrain from transmission of a traffic identifier (TID)-to-link mapping (T2LM) request frame to a network entity in response to the BTM request frame based on whether an association of a non-AP multi-link device (non-AP MLD) with the subset of affiliated APs of the AP MLD is to be maintained

518

Receive a T2LM request frame after reception of the BTM request frame

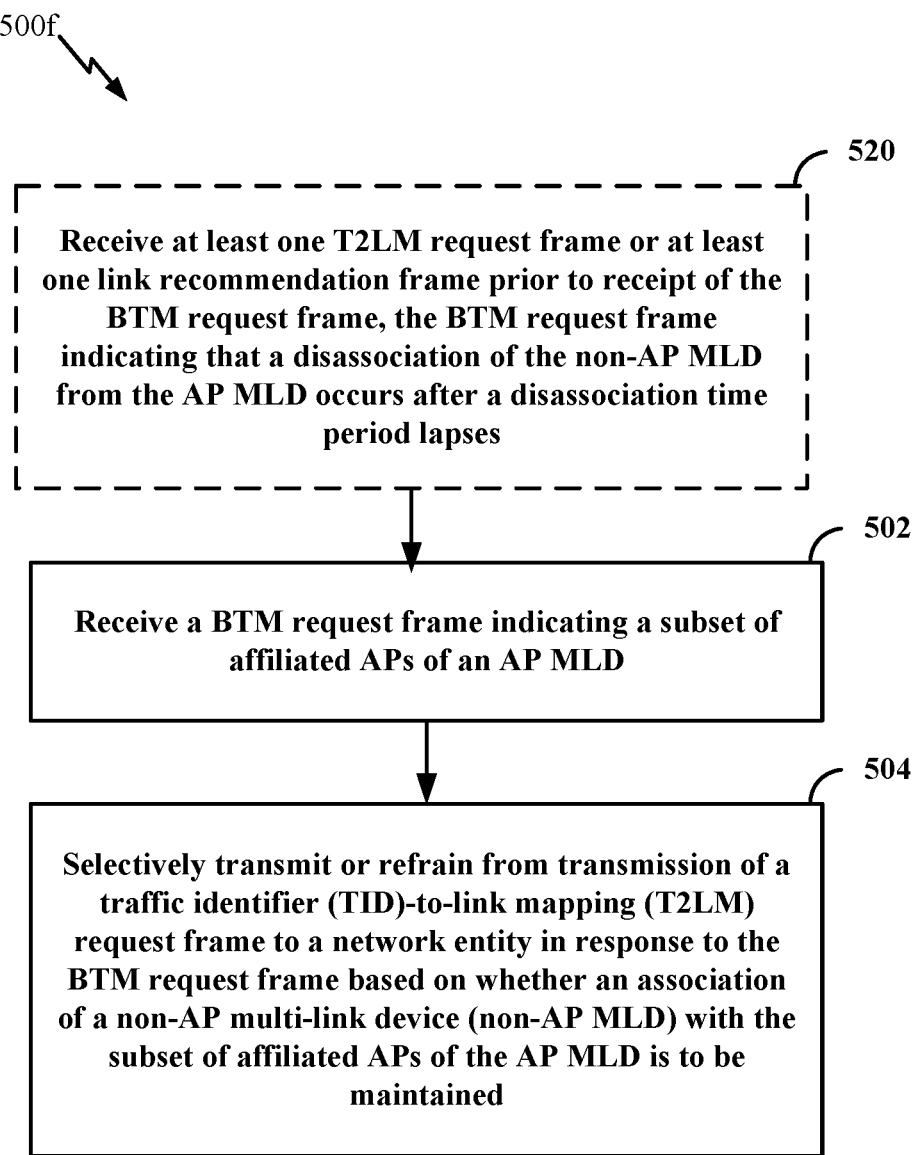

520

Receive at least one T2LM request frame or at least one link recommendation frame prior to receipt of the BTM request frame, the BTM request frame indicating that a disassociation of the non-AP MLD from the AP MLD occurs after a disassociation time period lapses

502

Receive a BTM request frame indicating a subset of affiliated APs of an AP MLD

504

Selectively transmit or refrain from transmission of a traffic identifier (TID)-to-link mapping (T2LM) request frame to a network entity in response to the BTM request frame based on whether an association of a non-AP multi-link device (non-AP MLD) with the subset of affiliated APs of the AP MLD is to be maintained

*Figure 5F*

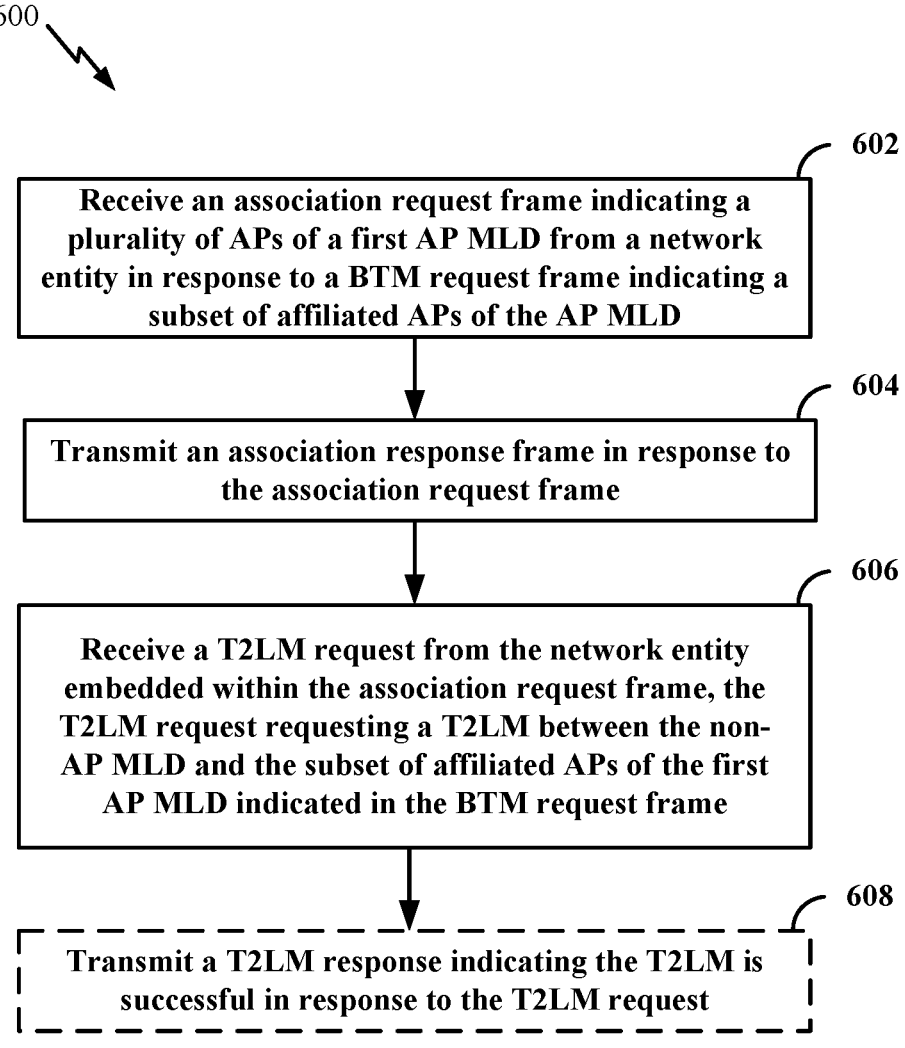

600

602

Receive an association request frame indicating a plurality of APs of a first AP MLD from a network entity in response to a BTM request frame indicating a subset of affiliated APs of the AP MLD

604

Transmit an association response frame in response to the association request frame

606

Receive a T2LM request from the network entity embedded within the association request frame, the T2LM request requesting a T2LM between the non-AP MLD and the subset of affiliated APs of the first AP MLD indicated in the BTM request frame

608

Transmit a T2LM response indicating the T2LM is successful in response to the T2LM request

Transmit a BTM request 722

728 — Initiate disassociation time period

Transmit an Association Request Frame 734

Transmit an Association Response Frame 736

730 — Determine that disassociation time period lapses

Transmit a T2LM request 724

Transmit a T2LM response indicating a successful T2LM 726

Transmit a disassociation frame 732

BTM-BASED LOAD BALANCING

PRIORITY INFORMATION

The present application for patent claims priority under 35 U.S.C. § 119 to U.S. Provisional Patent Application No. 63/373,279, filed Aug. 23, 2022 and entitled "BTM-BASED LOAD BALANCING," which is assigned to the assignee hereof and hereby expressly incorporated by reference herein.

TECHNICAL FIELD

This disclosure relates generally to wireless communication, and more specifically, to techniques for performing basic service set (BSS) transition management (BTM) based load balancing for a non-AP multi-link device (non-AP MLD) by an access point (AP).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, enterprise AP vendors may seek a mechanism for load balancing. A traffic identifier (TID)-to-Link mapping (T2LM) may offer a solution, but T2LM negotiations may not be guaranteed to lead to a successful mapping because the AP may propose a mapping, but the client is allowed to ignore or reject the proposed mapping. The AP can also subset the links on a global basis by transmitting a broadcast message, but this then puts all clients on the same subset of links which does not achieve the goals of load balancing

SUMMARY

The systems, methods, and devices of this disclosure each have several innovative aspects, no single one of which is solely responsible for the desirable attributes disclosed herein.

One innovative aspect of the subject matter described in this disclosure can be implemented in a wireless communication device. The wireless communication device includes at least one memory; and at least one processor communicatively coupled with the at least one memory. The at least one processor is operable to cause the wireless communication device to: transmit a basic service set (BSS) transition management (BTM) request frame indicating a subset of access points (APs) of an AP multi-link device (AP MLD). The wireless communication is affiliated with the AP MLD. The at least one processor is operable to further cause the wireless communication device to: selectively transmit or refrain from transmission of a disassociation frame indicating a disassociation of an associated non-AP multi-link device (non-AP MLD) from the AP MLD based at least in part on whether a traffic identifier (TID)-to-link mapping (T2LM) request frame is received from a network entity associated with the non-AP MLD in response to the BTM request frame. The T2LM request frame requests a T2LM between the non-AP MLD and the AP MLD.

Another innovative aspect of the subject matter described in this disclosure can be implemented in a wireless communication device. The wireless communication device includes at least one memory; and at least one processor communicatively coupled with the at least one memory. The at least one processor is operable to cause the wireless communication device to: receive a BTM request frame indicating a subset of affiliated APs of an AP MLD. The at least one processor is operable to further cause the wireless communication device to: selectively transmit or refrain from transmission of a T2LM request frame to a network entity in response to the BTM request frame based on whether an association of a non-AP MLD with the subset of affiliated APs of the AP MLD is to be maintained. The wireless communication device is affiliated with the non-AP MLD, and the T2LM request frame requests a T2LM between the non-AP MLD and the AP MLD.

Another innovative aspect of the subject matter described in this disclosure can be implemented in a method for wireless communication performable at a wireless communication device. The wireless communication device is a first network entity. The method includes transmitting a BTM request frame indicating a subset of affiliated APs of an AP MLD. The method further includes selectively transmitting or refraining from transmission of a disassociation frame indicating a disassociation of an associated non-AP MLD from the AP MLD based at least in part on whether a T2LM request frame is received from a second network entity affiliated with the non-AP MLD in response to the BTM request frame. The T2LM request frame requests a T2LM between the non-AP MLD and the AP MLD.

Another innovative aspect of the subject matter described in this disclosure can be implemented in a method for wireless communication performable at a first network entity. The method includes receiving a BTM request frame indicating a subset of affiliated APs of an AP MLD. The method further includes selectively transmitting or refraining from transmission of a T2LM request frame to a second network entity in response to the BTM request frame based on whether an association of a non-AP MLD with the subset of affiliated APs of the AP MLD is to be maintained. The first network entity is affiliated with the non-AP MLD, and the T2LM request frame requests a T2LM between the non-AP MLD and the AP MLD.

Another innovative aspect of the subject matter described in this disclosure can be implemented in a wireless communication device. The wireless communication device includes means for transmitting a BTM request frame indicating a subset of affiliated APs of an AP MLD. The wireless communication device further includes means for selectively transmitting or refraining from transmission of a disassociation frame indicating a disassociation of an associated non-AP MLD from the AP MLD based at least in part on whether a T2LM request frame is received from a network entity affiliated with the non-AP MLD in response to the BTM request frame. The T2LM request frame requests a T2LM between the non-AP MLD and the AP MLD.

Another innovative aspect of the subject can be implemented in a wireless communication device. The wireless communication device includes means for receiving a BTM request frame indicating a subset of AP of an AP MLD. The wireless communication device further includes means for selectively transmitting or refraining from transmission of a disassociation frame indicating a disassociation of an associated non-AP MLD from the AP MLD based at least in part on whether a T2LM request frame is received from a network entity affiliated with the non-AP MLD in response to the BTM request frame. The T2LM request frame requests a T2LM between the non-AP MLD and the AP MLD.

Another innovative aspect of the subject matter described in this disclosure can be implemented in a non-transitory computer-readable medium storing computer-executable code including stored instructions of communications, executable by a processor to: transmit a BTM request frame indicating a subset of affiliated APs of an AP MLD; and selectively transmit or refrain from transmission of a disassociation frame indicating a disassociation of an associated non-AP MLD from the AP MLD based at least in part on whether a T2LM request frame is received from a network entity affiliated with the non-AP MLD in response to the BTM request frame, the T2LM request frame requesting a T2LM between the non-AP MLD and the AP MLD.

Another innovative aspect of the subject matter described in this disclosure can be implemented in a non-transitory computer-readable medium storing computer-executable code including stored instructions of communications, executable by a processor to: receive a BTM request frame indicating a subset of affiliated APs of an AP MLD and selectively transmit or refrain from transmission of a T2LM request frame to a first network entity in response to the BTM request frame based on whether an association of a non-AP MLD with the subset of affiliated APs of the AP MLD is to be maintained, a second network entity including the processor being affiliated with the non-AP MLD, and the T2LM request frame requesting a T2LM between the non-AP MLD and the AP MLD.

Another innovative aspect of the subject matter described in this disclosure can be implemented in a wireless communication device. The wireless communication device includes at least one memory; and at least one processor communicatively coupled with the at least one memory. The at least one processor is operable to cause the wireless communication device to: receive an association request frame indicating a plurality of APs of an AP MLD from a network entity in response to a BTM request frame indicating a subset of affiliated APs of the AP MLD, the wireless communication device being affiliated with the AP MLD, the network entity being affiliated with a non-AP MLD, a source of the BTM request frame being affiliated with a different AP MLD than the AP MLD and a destination of the BTM request frame being the network entity. The at least one processor is operable to further cause the wireless communication device to: transmit an association response frame in response to the association request frame, and to receive a T2LM request from the network entity embedded within the association request frame, the T2LM request requesting a T2LM between the non-AP MLD and the subset of affiliated APs of the AP MLD indicated in the BTM request frame.

Another innovative aspect of the subject matter described in this disclosure can be implemented in a method for wireless communication performable at a first network entity. The method includes receiving an association request frame indicating a plurality of APs of an AP MLD from a network entity in response to a BTM request frame indicating a subset of affiliated APs of the AP MLD, the wireless communication device being affiliated with the AP MLD, the network entity being affiliated with a non-AP MLD, a source of the BTM request frame being affiliated with a different AP MLD than the AP MLD and a destination of the BTM request frame being the network entity. The method further includes transmitting an association response frame in response to the association request frame, and receiving a T2LM request from the network entity embedded within the association request frame, the T2LM request requesting a T2LM between the non-AP MLD and the subset of affiliated APs of the AP MLD indicated in the BTM request frame.

Another innovative aspect of the subject matter described in this disclosure can be implemented in a wireless communication device. The wireless communication device includes means for receiving an association request frame indicating a plurality of APs of an AP MLD from a network entity in response to a BTM request frame indicating a subset of affiliated APs of the AP MLD, the wireless communication device being affiliated with the AP MLD, the network entity being affiliated with a non-AP MLD, a source of the BTM request frame being affiliated with a different AP MLD than the AP MLD and a destination of the BTM request frame being the network entity. The wireless communication device further includes means for transmitting an association response frame in response to the association request frame. The wireless communication device further includes means for receiving a T2LM request from the network entity embedded within the association request frame, the T2LM request requesting a T2LM between the non-AP MLD and the subset of affiliated APs of the AP MLD indicated in the BTM request frame.

Another innovative aspect of the subject matter described in this disclosure can be implemented in a non-transitory computer-readable medium storing computer-executable code including stored instructions of communications, executable by a processor to: receive an association request frame indicating a plurality of APs of an AP MLD from a network entity in response to a BTM request frame indicating a subset of affiliated APs of the AP MLD, the wireless communication device being affiliated with the AP MLD, the network entity being affiliated with a non-AP MLD, a source of the BTM request frame being affiliated with a different AP MLD than the AP MLD and a destination of the BTM request frame being the network entity, transmit an association response frame in response to the association request frame, and receive a T2LM request from the network entity embedded within the association request frame, the T2LM request requesting a T2LM between the non-AP MLD and the subset of affiliated APs of the AP MLD indicated in the BTM request frame.

In some examples, the methods and wireless communications devices may include transmitting at least one T2LM request frame or at least one link recommendation to the network entity affiliated with the non-AP MLD prior to transmission of the BTM request frame. The BTM request frame may indicate that a disassociation of the associated non-AP MLD from the AP MLD occurs after a disassociation time period ends.

In some examples, the recommended APs in the BTM request frame match a proposed T2LM in the at least one T2LM request frame or a recommended set of links in the at least one link recommendation frame. In some examples, the BTM request frame is sent in response to the non-AP MLD rejecting or ignoring the AP MLD's proposed mapping in the T2LM request frame or recommendation in the at least one link recommendation frame sent. In some examples, the at least one T2ML request may be sent as a single T2LM request frame individually addressed to the network entity affiliated with the non-AP MLD or a plurality of link recommendation frames transmitted via a broadcast respectively to a plurality of network entities affiliated with a respective non-AP MLDs, including the network entity affiliated with the non-AP MLD.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

BRIEF DESCRIPTION OF THE DRAWINGS

FIGS. 4A-4G show flowcharts illustrating an example process performable by an AP that supports BTM-based load balancing.

FIG. 5A-5F show flowcharts illustrating an example process performable by a STA that supports BTM-based load balancing.

FIG. 6 shows a flowchart illustrating an example process performable by an AP that supports BTM-based load balancing.

Like reference numbers and designations in the various drawings indicate like elements.

DETAILED DESCRIPTION

Figure 1:
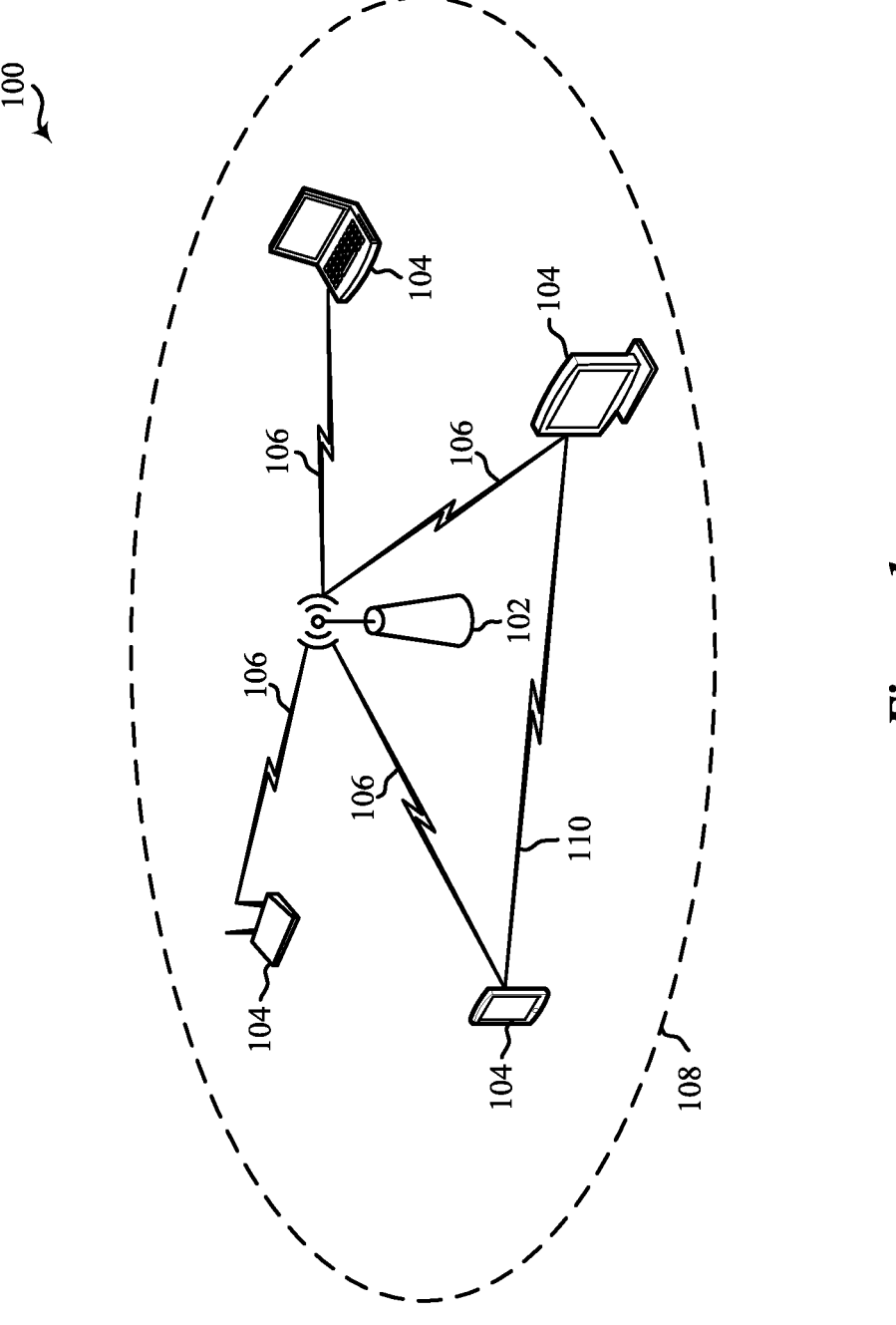
FIG. 1 shows a pictorial diagram of an example wireless communication network.

The following description is directed to some particular aspects for the purposes of describing innovative aspects of this disclosure. However, a person having ordinary skill in the art will readily recognize that the teachings herein can be applied in a multitude of different ways. The described aspects can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described aspects can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described aspects also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to a method of load balancing where an AP multi-link device (MLD) recommends that a non-AP MLD move to an indicated set of links of the AP MLD and operate on the indicated set of links without purging context between the AP MLD and the non-AP MLD. In some examples, if the non-AP MLD does not comply, then the non-AP MLD may face disassociation from the AP MLD. Some aspects more specifically relate to recommending that the non-AP MLD move to an indicated set of links of a different AP MLD and operate on the indicated set of links of the different AP MLD after performing a multi-link setup with the different AP MLD. In some examples, the AP MLD may then disassociate from the non-AP MLD.

Multi-link operations (MLOs) allow a pair of MLDs (such as an AP and a client device) to communicate over more than one link. For example, the pair of MLDs may discover, synchronize, de-authenticate, re-associate, disassociate, and manage resources with each other on any common bands or channels that are supported by both MLDs. One of the many features of multi-link operation is Traffic Identifier (TID)-to-Link mapping (T2LM). The T2LM mapping mechanism allows an AP MLD and a non-AP MLD that performed or is performing multi-link setup to determine how uplink and downlink Quality of Service (QoS) traffic corresponding to TID values (such as TIDs between 0 and 7) will be assigned to the setup links for the non-AP MLD. In T2LM, both parties may initiate a T2LM negotiation.

T2LM may offer a way to achieve the goal of load balancing. However, current T2LM approaches may not lead to a successful mapping because either party (such as the AP MLD or the non-AP MLD) may reject a proposed mapping. The AP MLD may transmit a proposal for link recommendations, but the proposal requires no obligation from the non-AP MLD to follow the recommendations. In other words, the non-AP MLD may choose to ignore or reject the recommendation from the AP MLD such that goals for load balancing will not be achieved.

The AP MLD may transmit a basic service set (BSS) transition management (BTM) request frame to recommend a client device (such as the non-AP MLD) to re-associate to an indicated link set (such as a subset of APs affiliated with the AP MLD). However, all context between the AP and the client devices will be purged due to the re-association or disassociation. In this case, all traffic on active data sessions such as block acknowledgement (BA) session, association context, and security keys are reset. This results in a disruption and leads to a bad user experience. As such, a mechanism would be helpful to enable the client device to maintain its association with a current AP MLD or to create an association with a different AP MLD while also shifting its operations to a subset of links.

To maintain its association with a current AP MLD or create an association with a different AP MLD while also shifting its operations to a subset of links after receiving a BTM request, in some aspects, an STA affiliated with a non-AP MLD may selectively transmit or refrain from transmission of a T2LM request frame to a network entity (such as an AP) in response to the BTM request. The network entity may be the same AP affiliated with the AP MLD from which the BTM request was received, or the network entity may be a different AP affiliated with a different AP MLD than from that which the BTM request was received. This allows an association of the non-AP MLD with the subset of affiliated APs of the AP MLD is to be respectively maintained or created in response to the T2LM request.

Similarly, in some aspects, an AP affiliated with an AP MLD may perform a multi-link setup with a non-AP MLD and move the non-AP MLD to a subset of its links in response to a T2LM request triggered by a BTM request originating from a different AP MLD. For instance, the AP may receive an association request frame indicating a plurality of APs of an AP MLD from a network entity (such as a non AP STA) in response to a BTM request frame indicating a subset of affiliated APs of the AP MLD, where a source of the BTM request frame is affiliated with a different AP MLD than the AP MLD and a destination of the BTM request frame is the network entity. After transmitting an association response frame in response to the association request frame (and thereby confirming the multi-link setup), the AP may receive the T2LM request from the network entity embedded within the association request frame. Thus, an association of the non-AP MLD with the subset of affiliated APs of the AP MLD may be created in response to the T2LM request.

Particular aspects of the subject matter described in the disclosure can be implemented to realize one or more of the following potential advantages. In some aspects, an AP affiliated with an AP MLD may selectively transmit, or refrain from transmission of, a disassociation frame indicating a disassociation of an associated non-AP multi-link device (non-AP MLD) from the AP MLD based at least in part on whether a T2LM request is received from a network entity (such as a non-AP STA) associated with the non-AP MLD in response to the BTM request. In some aspects, the T2LM allows movement of the non-AP MLD to different links without disruption such that association with the AP MLD does not need to be re-established. This also allows a multi-link setup and associated contexts between the AP MLD and the non-AP MLD to be maintained in response to the T2LM request. In some aspects, a disassociation frame may be transmitted in response to a failure to receive the T2LM request before a disassociation time period lapses. This provides a fallback option for both the AP MLD and the non-AP MLD.

FIG. 1 shows a pictorial diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a BSS, which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such aspects, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and MAC layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some aspects of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Some wireless communication devices (including both APs and STAs) are capable of MLO. In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 2:
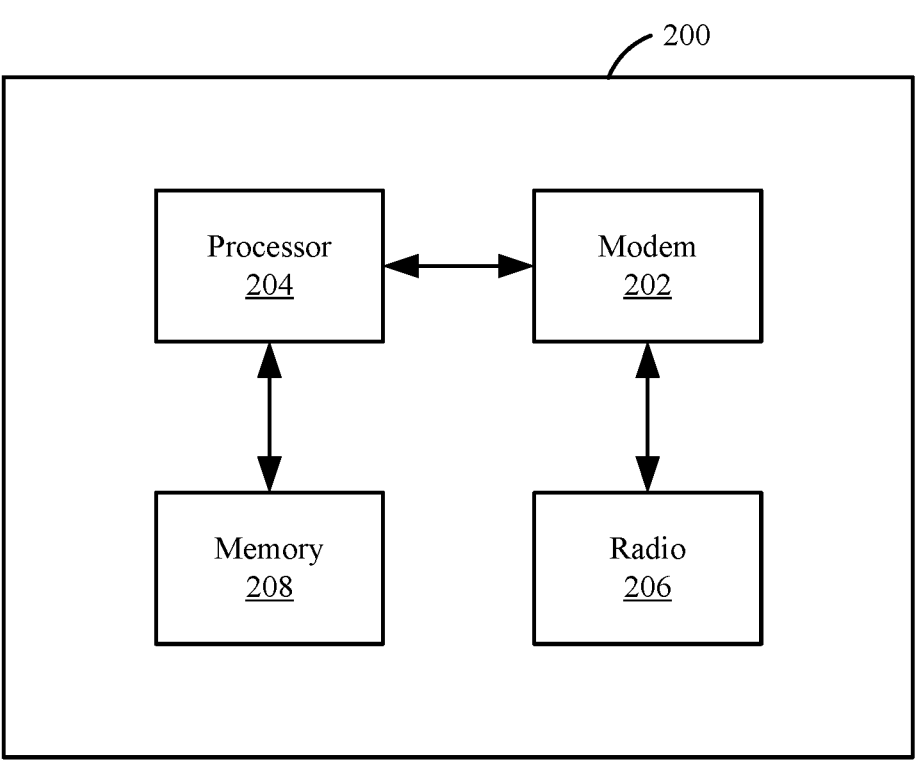
FIG. 2 shows a block diagram of an example wireless communication device that supports BTM-based load balancing.

FIG. 2 shows a block diagram of an example wireless communication device 200 that supports BTM-based load balancing according to some aspects of the present disclosure. In various examples, the wireless communication device 200 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 200 can be an example of a device for use in a STA such as one of the STAs 104 described with reference to FIG. 1. In some other examples, the wireless communication device 200 can be a STA that includes such a chip, SoC, chipset, package or device as well as multiple antennas. In some examples, the wireless communication device 200 can be an example of a device for use in an AP such as the AP 102 described above with reference to FIG. 1. In some other examples, the wireless communication device 200 can be an AP that includes such a chip, SoC, chipset, package or device as well as multiple antennas. The wireless communication device 200 is capable of transmitting and receiving wireless communications in the form of, for example, wireless packets. For example, the wireless communication device can be configured or operable to transmit and receive packets in the form of physical layer convergence protocol (PLCP) PPDUs and medium access control (MAC) protocol data units (MPDUs) conforming to one or more of the IEEE 802.11 family of wireless communication protocol standards, such as that defined by the IEEE 802.11-2016 specification or amendments thereof including, but not limited to, 802.11ay, 802.11ax, 802.11az, 802.11ba and 802.11be. In some examples, the wireless communication device 200 further includes at least one external network interface that enables communication with a core network or backhaul network to gain access to external networks including the Internet.

In various examples, the wireless communication device 200 can be, or can include, a chip, system on chip (SoC), chipset, package or device that may include: one or more modems 202, for example, a Wi-Fi (IEEE 802.11 compliant) modem. In some examples, the one or more modems 202 (collectively "the modem 202") additionally may include a cellular modem (for example, a 3GPP 4G LTE or 5G compliant modem). In some examples, the wireless communication device 200 also may include one or more processors, processing blocks or processing elements 204 (collectively "the processor 204") coupled with the modem 202. In some examples, the wireless communication device 200 additionally may include one or more radios 206

(collectively "the radio 206") coupled with the modem 202. In some examples, the wireless communication device 200 further may include one or more memory blocks or elements 208 (collectively "the memory 208") coupled with the processor 204 or the modem 202.

The modem 202 can include an intelligent hardware block or device such as, for example, an application-specific integrated circuit (ASIC) among other possibilities. The modem 202 is generally configured to implement a PHY layer, and in some aspects, also a portion of a MAC layer (for example, a hardware portion of the MAC layer). For example, the modem 202 is configured to modulate packets and to output the modulated packets to the radio 206 for transmission over the wireless medium. The modem 202 is similarly configured to obtain modulated packets received by the radio 206 and to demodulate the packets to provide demodulated packets. In addition to a modulator and a demodulator, the modem 202 may further include digital signal processing (DSP) circuitry, automatic gain control (AGC) circuitry, a coder, a decoder, a multiplexer and a demultiplexer. For example, while in a transmission mode, data obtained from the processor 204 may be provided to an encoder, which encodes the data to provide coded bits. The coded bits may then be mapped to a number Nss of spatial streams for spatial multiplexing or a number NSTS of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 206. In aspects involving beamforming, the modulated symbols in the respective spatial streams are precoded via a steering matrix prior to their provision to the IFFT block.

While in a reception mode, the DSP circuitry is configured to acquire a signal including modulated symbols received from the radio 206, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 204) for processing, evaluation or interpretation.

The radio 206 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some aspects, the wireless communication device 200 can include, or be coupled with, multiple transmit antennas (each with a corresponding transmit chain) and multiple receive antennas (each with a corresponding receive chain). The symbols output from the modem 202 are provided to the radio 206, which then transmits the symbols via the coupled antennas. Similarly, symbols received via the antennas are obtained by the radio 206, which then provides the symbols to the modem 202.

The processor 204 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 204 processes information received through the radio 206 and the modem 202, and processes information to be output through the modem 202 and the radio 206 for transmission through the wireless medium. For example, the processor 204 may implement a control plane and at least a portion of a MAC layer configured to perform various operations related to the generation, transmission, reception and processing of MPDUs, frames or packets. In some aspects, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some aspects, the processor 204 may generally control the modem 202 to cause the modem to perform various operations described above.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 204, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 3B:
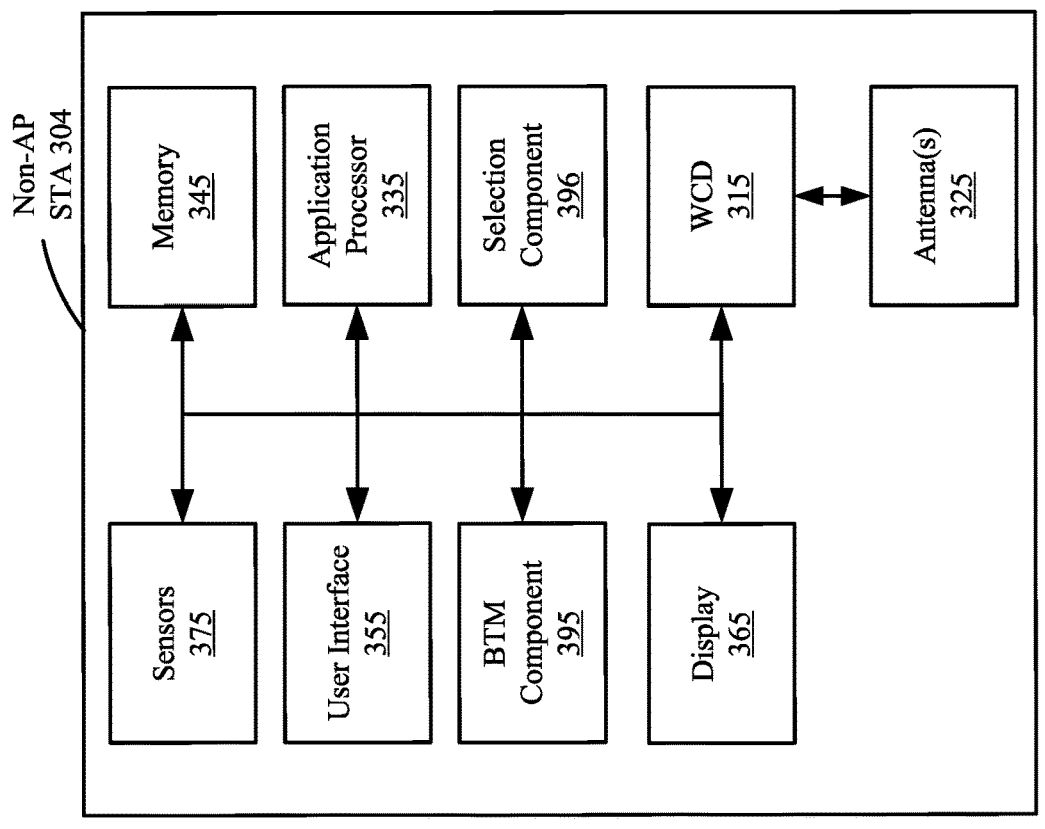
FIG. 3B shows a block diagram of an example non-AP station (STA) that supports BTM-based load balancing.
Figure 3A:
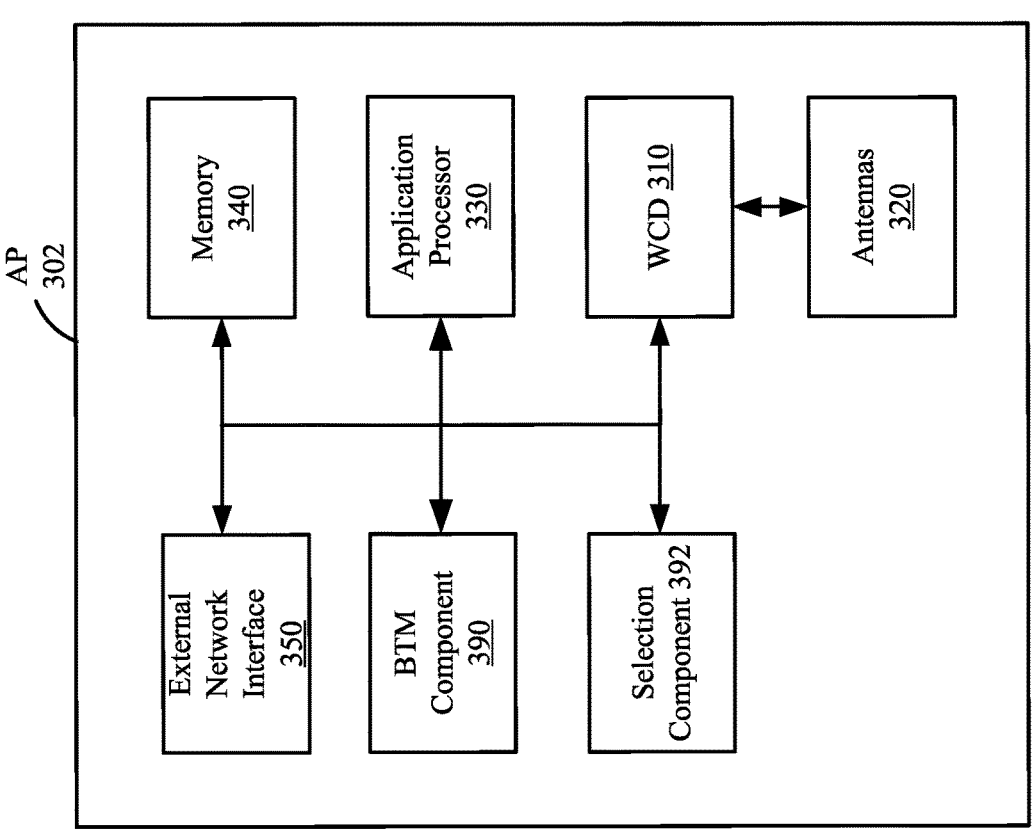
FIG. 3A shows a block diagram of an example access point (AP) that supports BTM-based load balancing.

FIG. 3A shows a block diagram of an example AP 302 that supports BTM-based load balancing according to some aspects of the present disclosure. For example, the AP 302 can be an example aspect of the AP 102 described with reference to FIG. 1. The AP 302 includes a wireless communication device (WCD) 310 (although the AP 302 may itself also be referred to generally as a wireless communication device as used herein). For example, the wireless communication device 310 may be an example aspect of the wireless communication device 200 described with reference to FIG. 2. In some examples, the AP 302 or wireless communication device 310 is configured or operable to perform the process 400a, 400b, 400c, 400d, 400e, 400f, and 400g described with reference to FIGS. 4A-4G and the process 600 described with reference to FIG. 6. The AP 302 also includes multiple antennas 320 coupled with the wireless communication device 310 to transmit and receive wireless communications. In some examples, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Ones of the aforementioned components can communicate with other ones of the components directly or indirectly, over at least one bus. The AP 302 further includes a housing that encompasses the wireless communication device 310, the application processor 330, the memory 340, and at least portions of the antennas 320 and external network interface 350.

The AP 302 or wireless communication device 310 includes a BTM component 390, and a selection component 392. Portions of one or more of the components 392, and 394 may be implemented at least in part in hardware or firmware. For example, the BTM component 392 may be implemented at least in part by a modem. In some examples, at least some of the components 392 and 394 are implemented at least in part by a processor and as software stored in a memory. For example, portions of one or more of the components 302 or 304 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the AP 302 or device 310). For example, a processing system of the AP 302 or device 310 may refer to a system including the various other components or subcomponents of the AP 302 or device 310, such as the processor, or a transceiver, or a communications manager, or other components or combinations of components of the AP 302 or device 310. The processing system of the AP 302 or device 310 may interface with other components of the AP 302 or device 310, and may process information received from other components (such as inputs or signals) or output information to other components. For example, a chip or modem of the AP 302 or device 310 may include a processing system, a first interface to output information and a second interface to obtain information. In some implementations, the first interface may refer to an interface between the processing system of the chip or modem and a transmitter, such that the AP 302 or device 310 may transmit information output from the chip or modem. In some implementations, the second interface may refer to an interface between the processing system of the chip or modem and a receiver, such that the AP 302 or device 310 may obtain information or signal inputs, and the information may be passed to the processing system. A person having ordinary skill in the art will readily recognize that the first interface also may obtain information or signal inputs, and the second interface also may output information or signal outputs.

The BTM component 390 is capable of, configured to, or operable to transmit a BTM request frame indicating a subset of affiliated APs of an AP MLD.

The selection component 392 is capable of, configured to, or operable to selectively transmit or refrain from transmission of a disassociation frame indicating a disassociation of an associated non-AP MLD from the AP MLD based at least in part on whether a T2LM request frame is received from a network entity affiliated with the non-AP MLD in response to the BTM request frame, the T2LM request frame requesting a T2LM between the non-AP MLD and the AP MLD.

FIG. 3B shows a block diagram of an example non-AP STA 304 that supports BTM-based load balancing according to some aspects of the present disclosure. For example, the non-AP STA 304 can be an example aspect of the STA 104 described with reference to FIG. 1. The non-AP STA 304 includes a wireless communication device (WCD) 315 (although the non-AP STA 304 may itself also be referred to generally as a wireless communication device as used herein). For example, the wireless communication device 315 may be an example aspect of the wireless communication device 200 described with reference to FIG. 2. In some examples, the non-AP STA 304 or wireless communication device 315 is configured or operable to perform the process 500a, 500b, 500c, 500d, 500e, and 500f described with reference to FIGS. 5A-5F. The non-AP STA 304 also includes one or more antennas 325 coupled with the wireless communication device 315 to transmit and receive wireless communications. In some examples, the non-AP STA 304 or wireless communication device 315 additionally includes or can be coupled with an application processor 335 which may be further coupled with a memory 345. In some examples, the non-AP STA 304 or wireless communication device 315 further includes a user interface (UI) 355 (such as a touchscreen or keypad) and a display 365, which may be integrated with the UI 355 to form a touchscreen display. In some aspects, the non-AP STA 304 or wireless communication device 315 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The non-AP STA 304 further includes a housing that encompasses the wireless communication device 315, the application processor 335, the memory 345, and at least portions of the antennas 325, UI 355, and display 365.

The non-AP STA 304 or wireless communication device 315 includes a BTM component 394, and a selection component 396. Portions of one or more of the components 394, and 396 may be implemented at least in part in hardware or firmware. For example, the BTM component 394 may be implemented at least in part by a modem. In some examples, at least some of the components 394 and 396 are implemented at least in part by a processor and as software stored in a memory. For example, portions of one or more of the components 394 or 396 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the non-AP STA 304 or device 315). For example, a processing system of the non-AP STA 304 or device 315 may refer to a system including the various other components or subcomponents of the non-AP STA 304 or device 315, such as the processor, or a transceiver, or a communications manager, or other components or combinations of components of the non-AP STA 304 or device 315. The processing system of the non-AP STA 304 or device 315 may interface with other components of the non-AP STA 304 or device 315, and may process information received from other components (such as inputs or signals) or output information to other components. For example, a chip or modem of the non-AP STA 304 or device 315 may include a processing system, a first interface to output information and a second interface to obtain information. In some implementations, the first interface may refer to an interface between the processing system of the chip or modem and a transmitter, such that the non-AP STA 304 or device 315 may transmit information output from the chip or modem. In some implementations, the second interface may refer to an interface between the processing system of the chip or modem and a receiver, such that the non-AP STA 304 or device 315 may obtain information or signal inputs, and the information may be passed to the processing system. A person having ordinary skill in the art will readily recognize that the first interface also may obtain information or signal inputs, and the second interface also may output information or signal outputs.

The BTM component 394 is capable of, configured to, or operable to receive a BTM request frame indicating a subset of affiliated APs of an AP MLD.

The selection component 396 is capable of, configured to, or operable to selectively transmit or refrain from transmission of a T2LM request frame to a network entity in response to the BTM request frame based on whether an association of a non-AP MLD with the subset of affiliated APs of the AP MLD is to be maintained, the wireless communication device being affiliated with the non-AP MLD, and the T2LM request frame requesting a T2LM between the non-AP MLD and the AP MLD.

FIG. 4A shows a flowchart illustrating an example process 400a performable at one of the APs of an AP MLD that supports BTM-based load balancing according to some aspects of the present disclosure. Optional aspects are illustrated in dashed lines. The operations of the process 400a may be implemented by one of the APs of an AP MLD or its components as described herein. For example, the process 400a may be performed by a wireless communication device such as the wireless communication device 200 described with reference to FIG. 2, the wireless communication device 310 described with reference to FIG. 3A and/or the AP 102, 302 in FIGS. 1 and 3A (referred to throughout process 400a as the wireless communication device), operating as or within a wireless AP. In some examples, the process 400a may be performed by a wireless AP such as one of the APs 102 described with reference to FIG. 1.

At block 402, the process 400a includes transmitting a BTM request frame indicating a subset of affiliated APs of an AP MLD. The wireless communication device is affiliated with the AP MLD. In some aspects, the BTM request frame may be transmitted by the AP or an AP affiliated with the AP MLD in response to a BSS Transition Management Query frame, or autonomously. One or more components of wireless communication device 200, 310 or of AP 102, 302 may constitute the means for transmitting. In some aspects, the wireless communication device is affiliated with the AP MLD and the BTM request frame is transmitted to a non-AP STA (or STA) affiliated with a non-AP MLD. For example, in an aspect, the AP 302 may activate the WCD 310 to transmit, using the antennas 320 the BTM request on a link between the AP 302 and the non-AP STA 304. As another example, in FIG. 7A, the AP 702 transmits a BTM request 722 to the non-AP STA 704 indicating a subset of affiliated APs affiliated with an AP MLD including AP 702.

At block 404, the process 400a includes selectively transmitting or refraining from transmission of a disassociation frame indicating a disassociation of an associated non-AP MLD from the AP MLD based at least in part on whether a T2LM request is received from a network entity associated with the non-AP MLD in response to the BTM request. The T2LM request frame requests a T2LM between the non-AP MLD and the AP MLD. In some aspects, the network entity is a non-AP STA and the wireless communication device is one of the APs of the AP MLD. One or more components of wireless communication device 200, 310 or of AP 102, 302 may constitute the means for selectively transmitting or refraining. In some aspects, the T2LM request frame may request a T2LM between the non-AP MLD and the AP MLD.

In some aspects, requesting the T2LM corresponds to the AP MLD supporting T2LM mapping negotiations. When a negotiated T2LM is in effect, a TID can be mapped to a link set, which is a subset of setup links, spanning from one setup link to all the setup links. A setup link is defined as enabled for a non-AP MLD if at least one TID is mapped to that link either in DL or in UL and is defined as disabled if no TIDs are mapped to that link both in DL and UL. At any point in time, a TID shall be mapped to at least one setup link both in DL and UL, which indicates that a T2LM change is valid and successful if it will not result in having any TID for which the link set for downlink (DL) or uplink (UL) is made of zero setup links. By default, all setup links may be enabled.

During a multi-link setup procedure, a non-AP MLD may initiate a T2LM mapping negotiation by including the T2LM element in a re-association (or association) request frame if an AP MLD has indicated a support of T2LM mapping negotiation. After the multi-link setup is successful and handshake is complete, to negotiate a new T2LM mapping, an initiating non-AP MLD may send an individually addressed T2LM request frame to a responding MLD that has indicated support of T2LM mapping negotiation.

In some aspects, the network entity may be a non-AP station (STA) affiliated with the non-AP MLD.

In some aspects, the wireless communication device is one of the APs of the AP MLD.

In some aspects, the T2LM is requested by the associated non-AP MLD between the non-AP MLD and a subset of affiliated APs of the AP MLD indicated in the BTM request frame. For example, a non-AP MLD may have 2.4 GHz, 5 GHz, and 6 GHz links enabled with the AP MLD from respective APs affiliated with the AP MLD. Following the example, the AP MLD, via a BTM request frame, may indicate subsetting to 2.4 GHz and 5 GHz links from respective APs (such as from two affiliated APs, which is a subset of the three affiliated APs including 2.4, 5, and 6 GHz links), and the T2LM request from the non-AP MLD may similarly indicate a mapping of traffic identifier(s) to the 2.4 GHz and 5 GHz links.

In some aspects, the T2LM is requested by the associated non-AP MLD and a subset of the subset of affiliated APs of the AP MLD indicated in the BTM request frame. For example, a non-AP MLD may have 2.4 GHz, 5 GHz, and 6 GHz enabled with the AP MLD. Following the example, the AP MLD, via a BTM request frame, may indicate subsetting to 2.4 GHz and 5 GHz and the T2LM request from the non-AP MLD may indicate only 5 GHz (such as further subset of AP's indication) because it has some constraints (such as coexisting conditions) on the 2.4 GHz link. Thus, the T2LM request from the non-AP MLD may indicate a mapping of traffic identifier(s) to the 5 GHz link but not the 2.4 GHz link notwithstanding its indication in the BTM request frame.

In some aspects, the T2LM is requested by the associated non-AP MLD between the non-AP MLD and a different subset of affiliated APs of the AP MLD than the subset of affiliated APs indicated in the BTM request frame. For example, a non-AP MLD may have constraints on the indicated subset and tries to find alternative that may work for the AP MLD. For example, a non-AP MLD may have 2.4 GHz, 5 GHz, and 6 GHz enabled with the AP MLD. Following the example, the AP MLD, via a BTM request frame, may indicate subsetting to 2.4 GHz and 5 GHz and the T2LM request from the non-AP MLD may indicate only 6 GHz (such as different subset of AP's indication) because it has some constraints on the 2.4 GHz and 5 GHz links. The AP does not have to accept the alternative, but the non-AP MLD is attempting to work something out with the AP. In this example, it is possible that the AP rejects (such as via a T2LM response frame including status code 133) the request and disassociates the client. Alternatively, the AP may accept the new proposal and transmit an acceptance (such as via a T2LM response frame including status code 0). In some aspects, the T2LM request includes a reason code corresponding to why the non-AP MLD is requesting a particular mapping (or "alternative" mapping). This allows the AP MLD to recognize a constraint of the non-AP MLD and consider accommodating the particular mapping (such as the "alternative" mapping) that the non-AP MLD is proposing.

In some aspects, the BTM request frame may include a disassociation imminent field indicating that a disassociation of the associated non-AP MLD from the AP MLD occurs after a disassociation time period lapses, and the BTM request frame may include a neighbor report element indicating the subset of affiliated APs of the AP MLD (such as the links where the AP MLD wishes the non-AP MLD shifts its operations to). The disassociation imminent field may indicate whether the STA or the non-AP MLD will be disassociated from the current AP or AP MLD. The value 1 in the disassociation imminent field may indicate that the STA or the non-AP MLD is to be disassociated from the current AP or AP MLD. The value 0 in the disassociation imminent field may indicate that disassociation from the AP or AP MLD will not occur in response to the BTM request frame. In some aspects, the disassociation frame is selectively transmitted or refrained from transmission based on whether the T2LM request is received within the disassociation time period.

Optionally, at block 406, the process 400a includes receiving the T2LM request in response to the BTM request frame. One or more components of wireless communication device 200, 310 or of AP 102, 302 may constitute the means for receiving.

Optionally, at block 408, the process 400a includes refraining from transmission of the disassociation frame in response to the T2LM request frame. One or more components of wireless communication device 200, 310 or of AP 102, 302 may constitute the means for refraining.

Optionally, at block 410, the process 400a includes transmitting a T2LM response indicating a successful T2LM in response to the T2LM request frame. One or more components of wireless communication device 200, 310 or of AP 102, 302 may constitute the means for transmitting. For example, referring to FIG. 7A, the AP 702 may transmit a T2LM response 726 indicating a successful T2LM between its AP MLD and the non-AP MLD including the non-AP STA 704.

In some aspects, a multi-link setup and associated contexts between the AP MLD and the non-AP MLD are maintained in response to the T2LM request frame.

FIG. 4B shows a flowchart illustrating an example process 400b performable at one of the APs of an AP MLD that supports BTM-based load balancing according to some aspects. Optional aspects are illustrated in dashed lines. The operations of process 400b may be implemented by one of the APs of an AP MLD or its components as described herein. For example, the process 400b may be performed by the wireless communication device such as the wireless communication device 200 described with reference to FIG. 2, the wireless communication device 310 described with reference to FIG. 3A, and/or the AP 102, 302 in FIGS. 1, the wireless communication device 310 described with reference to FIG. 3A (referred to throughout process 400b as the wireless communication device), operating as or within a wireless AP. In some examples, the process 400b may be performed by a wireless AP such as one of the APs 102 described with reference to FIG. 1.

At block 402, the process 400b includes transmitting a BTM request frame indicating a subset of affiliated APs of an AP MLD, as described at block 402 of process 400a.

At block 404, the process 400b includes selectively transmitting or refraining from transmission of a disassociation frame indicating a disassociation of an associated non-AP MLD from the AP MLD based at least in part on whether a T2LM request is received from a network entity associated with the non-AP MLD in response to the BTM request, as described at block 404 of process 400a.

In some aspects, the BTM request frame indicates that a disassociation of the associated non-AP MLD from the AP MLD occurs after a disassociation time period lapses.

Optionally, at block 412, the process 400b includes transmitting the disassociation frame in response to a failure to receive the T2LM request frame before the disassociation time period lapses. One or more components of wireless communication device 200, 310 or of AP 102, 302 may constitute the means for transmitting. For example, referring to FIG. 7B, following transmission of the BTM request, a disassociation time period indicated in the BTM request may be initiated at block 728. During this time period, the AP 702 may not receive a T2LM request from non-AP STA 704 to operate on a subset of links of the AP MLD including the AP 702. Thus, in response to the disassociation time period elapsing 730, the AP 702 may transmit a disassociation frame 732 to the non-AP STA 704 indicating a disassociation of the associated non-AP MLD including non-AP STA 704 from the AP MLD including AP 702 in response to the AP's failure to receive the T2LM request before the disassociation time period lapses FIG. 4C shows a flowchart illustrating an example process 400c performable at one of the APs of an AP MLD that supports BTM-based load balancing according to some aspects of the present disclosure. Optional aspects are illustrated in dashed lines. The operations of process 400c may be implemented by one of the APs of an AP MLD or its components as described herein. For example, the process 400c may be performed by the wireless communication device such as the wireless communication device 200 described with reference to FIG. 2, the wireless communication device 310 described with reference to FIG. 3A, and/or the AP 102, 302 in FIGS. 1, 3A (referred to throughout process 400c as the wireless communication device), operating as or within a wireless AP. In some examples, the process 400c may be performed by a wireless AP such as one of the APs 102 described with reference to FIG. 1.

At block 402, the process 400c includes transmitting a BTM request frame indicating a subset of affiliated APs of an AP MLD, as described at block 402 of process 400a.

At block 404, the process 400c includes selectively transmitting or refraining from transmission of a disassociation frame indicating a disassociation of an associated non-AP MLD from the AP MLD based at least in part on whether a T2LM request is received from a network entity associated with the non-AP MLD in response to the BTM request, as described at block 404 of process 400a.

Optionally, at block 414, the process 400c includes transmitting at least one T2LM request frame to the network entity affiliated with the non-AP MLD prior to transmission of the BTM request frame. In some aspects, the BTM request frame may indicate that a disassociation of the associated non-AP MLD from the AP MLD occurs after a disassociation time period lapses. In some aspects, the T2LM request from the AP MLD may include a reason code corresponding to why the AP is requesting the non-AP MLD to change the existing mapping. The reason codes provide encouragement or motivation to encourage the non-AP MLD to accept the AP's request. One or more components of wireless communication device 200, 310 or of AP 102, 302 may constitute the means for transmitting. For example, referring to FIG. 7D, the AP STA 702 may transmit a T2LM request 742 to the non-AP STA 704 to operate on a subset of links of the AP MLD including the AP 702.

FIG. 4D shows a flowchart illustrating an example process 400d performable at one of the APs of an AP MLD that supports BTM-based load balancing according to some aspects of the present disclosure. Optional aspects are illustrated in dashed lines. The operations of process 400d may be implemented by one of the APs of an AP MLD or its components as described herein. For example, the process 400d may be performed by the wireless communication device such as the wireless communication device 200 described with reference to FIG. 2, the wireless communication device 310 described with reference to FIG. 3A, and/or the AP 102, 302 in FIGS. 1, 3A (referred to throughout process 400d as the wireless communication device), operating as or within a wireless AP. In some examples, the process 400d may be performed by a wireless AP such as one of the APs 102 described with reference to FIG. 1.

Optionally, at block 416, the process 400d includes transmitting the BTM request frame in a broadcast. In some aspects, the BTM request frame may include a mechanism to identify non-AP MLDs, such as information identifying non-AP MLDs. For example, the AP may include one or more association identifiers (AIDs) respectively for a plurality of network entities including the network entity affiliated with the non-AP MLD. One or more components of wireless communication device 200, 310 or of AP 102, 302 may constitute the means for transmitting.

At block 404, the process 400d includes selectively transmitting or refraining from transmission of a disassociation frame indicating a disassociation of an associated non-AP MLD from the AP MLD based at least in part on whether a T2LM request is received from a network entity associated with the non-AP MLD in response to the BTM request, as described with respect to block 404 at process 400a.

In some aspects, the BTM request frame may include a reason code indicating a basis for disassociation of the associated non-AP MLD from the AP MLD In some aspects, the basis may be a failure in T2LM negotiations for load balancing between the AP MLD and the non-AP MLD.

FIG. 4E shows a flowchart illustrating an example process 400e performable at one of the APs of an AP MLD that supports BTM-based load balancing according to some aspects of the present disclosure. Optional aspects are illustrated in dashed lines. The operations of process 400e may be implemented by one of the APs of an AP MLD or its components as described herein. For example, the process 400e may be performed by the wireless communication device such as the wireless communication device 200 described with reference to FIG. 2, the wireless communication device 310 described with reference to FIG. 3A, and/or the AP 102, 302 in FIGS. 1, 3A (referred to throughout process 400e as the wireless communication device), operating as or within a wireless AP. In some examples, the process 400e may be performed by a wireless AP such as one of the APs 102 described with reference to FIG. 1.

At block 402, the process 400e includes transmitting a BTM request frame indicating a subset of affiliated APs of an AP MLD, as described with respect to block 402 at process 400a.

At block 404, the process 400e includes selectively transmitting or refraining from transmission of a disassociation frame indicating a disassociation of an associated non-AP MLD from the AP MLD based at least in part on whether a T2LM request is received from a network entity associated with the non-AP MLD in response to the BTM request, as described with respect to block 404 at process 400a.

Optionally, at block 418, the process 400e includes transmitting a T2LM request frame to the network entity affiliated with the non-AP MLD after transmission of the BTM request frame. In some aspects, the BTM request frame may indicate that a disassociation of the associated non-AP MLD from the AP MLD occurs after a disassociation time period lapses. One or more components of wireless communication device 200, 310 or of AP 102, 302 may constitute the means for transmitting.

In some aspects, the BTM request frame may indicate that a disassociation of the associated non-AP MLD from the AP MLD does not occur after a disassociation time period lapses.

FIG. 4F shows a flowchart illustrating an example process 400f performable at one of the APs of an AP MLD that supports BTM-based load balancing according to some aspects of the present disclosure. Optional aspects are illustrated in dashed lines. The operations of process 400f may be implemented by one of the APs of an AP MLD or its components as described herein. For example, the process 400f may be performed by the wireless communication device such as the wireless communication device 200 described with reference to FIG. 2, the wireless communication device 310 described with reference to FIG. 3A, and/or the AP 102, 302 in FIGS. 1, 3A (referred to throughout process 400f as the wireless communication device), operating as or within a wireless AP. In some examples, the process 400f may be performed by a wireless AP such as one of the APs 102 described with reference to FIG. 1.

At block 420, the process 400f includes transmitting at least one T2LM request frame or at least one link recommendation to the network entity affiliated with the non-AP MLD prior to transmission of the BTM request frame, the BTM request frame indicating that a disassociation of the associated non-AP MLD from the AP MLD occurs after a disassociation time period begins. For example, referring to FIG. 7D, the AP 702 transmits one or more T2LM request frames or link recommendations 742 to the non-AP STA 704.

In some aspects, the subset of affiliated APs in the BTM request frame matches a proposed T2LM in the at least one T2LM request frame or a recommended set of links in the at least one link recommendation frame. In some aspects, the BTM request frame is transmitted in response to a lack of acceptance from the associated non-AP MLD of a proposed T2LM in the at least one T2LM request frame or a recommended set of links in the at least one link recommendation frame. For example, referring to FIG. 7D, in response to not receiving the T2LM request, the AP 702 will transmit a BTM request 748 frame to the non-AP STA 704 indicating the subset of affiliated APs of an AP MLD along with an indication that disassociation of the associated non-AP MLD from the AP MLD will occur after a disassociation time period if the non-AP STA 704 does not comply. In some aspects, the at least one link recommendation frame indicates a recommended set of links and is one of: a single link recommendation frame individually addressed to the network entity affiliated with the non-AP MLD or a plurality of link recommendation frames transmitted via a broadcast respectively to a plurality of network entities affiliated with a respective non-AP MLDs, including the network entity affiliated with the non-AP MLD.

In some aspects, the at least one T2LM request frame indicates a proposed T2LM and is one of: a single T2LM request frame individually addressed to the network entity affiliated with the non-AP MLD, or a plurality of T2LM request frames transmitted via a broadcast respectively to a plurality of network entities affiliated with respective non-AP MLDs, including the network entity affiliated with the non-AP MLD.

At block 402, the process 400b includes transmitting a BTM request frame indicating a subset of affiliated APs of an AP MLD, as described at block 402 of process 400a.

At block 404, the process 400b includes selectively transmitting or refraining from transmission of a disassociation frame indicating a disassociation of an associated non-AP MLD from the AP MLD based at least in part on whether a T2LM request is received from a network entity associated with the non-AP MLD in response to the BTM request, as described at block 404 of process 400a.

FIG. 4G shows a flowchart illustrating an example process 400g performable at one of the APs of an AP MLD that supports BTM-based load balancing according to some aspects of the present disclosure. Optional aspects are illustrated in dashed lines. The operations of process 400g may be implemented by one of the APs of an AP MLD or its components as described herein. For example, the process 400g may be performed by the wireless communication device such as the wireless communication device 200 described with reference to FIG. 2, the wireless communication device 310 described with reference to FIG. 3A, and/or the AP 102, 302 in FIGS. 1, 3A (referred to throughout process 400g as the wireless communication device), operating as or within a wireless AP. In some examples, the process 400g may be performed by a wireless AP such as one of the APs 102 described with reference to FIG. 1.

At block 402, the process 400b includes transmitting a BTM request frame indicating a subset of affiliated APs of an AP MLD, as described at block 402 of process 400a.

At block 422, the process 400g may include transmitting a frame following the BTM request frame and indicating that the disassociation of the associated non-AP MLD from the AP MLD will not occur in response to the AP MLD receiving the T2LM request frame from the network entity affiliated with the non-AP MLD. In some aspects, the frame indicating that the disassociation will not occur if a T2LM response frame transmitted in response to the T2LM request frame. For example, referring back to FIG. 7D, the AP 702 transmits a T2LM response indicating a successful T2LM 752.

At block 404, the process 400*b* includes selectively transmitting or refraining from transmission of a disassociation frame indicating a disassociation of an associated non-AP MLD from the AP MLD based at least in part on whether a T2LM request is received from a network entity associated with the non-AP MLD in response to the BTM request, as described at block 404 of process 400*a*.

FIG. 5A shows a flowchart illustrating an example process 500*a* for communications at a non-AP MLD (or a non-AP STA affiliated with the non-AP MLD). Optional aspects are illustrated in dashed lines. The operations of the process 500*a* may be implemented by a wireless STA or its components as described herein. For example, the process 500*a* may be performed by a wireless communication device such as the wireless communication device 315 described with reference to FIG. 3B, operating as or within a wireless STA. In some examples, the process 500*a* may be performed by a wireless STA such as one of the STAs 104 described with reference to FIG. 1.

At block 502, the process 500*a* includes receiving a BTM request indicating a subset of affiliated APs of an AP MLD. One or more components of wireless communication device 200, 315 or of non-AP STA 104, 304 may constitute the means for receiving. For example, in an aspect, the non-AP STA 304 may activate the WCD 315 to receive, using the antennas 325, the BTM request on a link between an AP 302 affiliated with the AP MLD and the non-AP STA 304, or on a link between the non-AP STA 304 and an AP 302 affiliated with a different AP MLD than the AP MLD indicated in the BTM request. For example, referring to FIG. 7A, the non-AP STA 704 may receive a BTM request 722 indicating a subset of affiliated APs affiliated with an AP MLD including the AP 702.

At block 504, the process 500*a* includes selectively transmitting or refraining from transmission of a T2LM request frame to a network entity in response to the BTM request frame based on whether an association of a non-AP MLD with the subset of affiliated APs of the AP MLD is to be maintained. One or more components of wireless communication device 200, 315 or of non-AP STA 104, 304 may constitute the means for selectively transmitting or refraining. In some aspects, the wireless communication device may be affiliated with the non-AP MLD and the T2LM request frame may request a T2LM between the non-AP MLD and the AP MLD.

In some aspects, the wireless communication device may be a non-AP STA.

In some aspects, the network entity may be one of the APs of the AP MLD indicated in the BTM request frame.

In some aspects, the BTM request frame may be received from a different network entity affiliated with a different AP MLD than the AP MLD indicated in the BTM request frame.

In some aspects, the T2LM may be requested between the non-AP MLD and a subset of the subset of affiliated APs of the AP MLD indicated in the BTM request frame.

In some aspects, the T2LM may be requested between the non-AP MLD and a different subset of affiliated APs of the AP MLD than the subset of affiliated APs indicated in the BTM request frame.

In some aspects, the BTM request may comprise: a disassociation imminent field indicating that a disassociation of the associated non-AP MLD from the AP MLD occurs after a disassociation time period lapses and a neighbor report element indicating the subset of affiliated APs of the AP MLD. In some aspects, the T2LM request may be transmitted within the disassociation time period.

Optionally, at block 506, the process 500*a* includes transmitting the T2LM request frame. One or more components of wireless communication device 200, 315 or of non-AP STA 104, 304 may constitute the means for transmitting. For example, referring to FIG. 7A, the non-AP STA 704 may transmit a T2LM request 724 to the AP 702 to operate on a subset of links of the AP MLD including the AP 702.

Optionally, at block 508, the process 500*a* includes receiving a T2LM response indicating the T2LM is successful in response to the T2LM request frame. One or more components of wireless communication device 200, 315 or of non-AP STA 104, 304 may constitute the means for receiving. For example, referring to FIG. 7A, the non-AP STA 704 may receive a T2LM response 726 indicating a successful T2LM between its AP MLD and the non-AP MLD including the non-AP STA 704.

In some aspects, a multi-link setup and associated contexts between the AP MLD and the non-AP MLD may be maintained or created in response to the T2LM request.

FIG. 5B shows a flowchart illustrating an example process 500*b* for communications at a non-AP MLD (or a non-AP STA). Optional aspects are illustrated in dashed lines. The operations of the process 500*b* may be implemented by a wireless STA or its components as described herein. For example, the process 500*b* may be performed by a wireless communication device such as the wireless communication device 315 described with reference to FIG. 9B, operating as or within a wireless STA. In some examples, the process 500*b* may be performed by a wireless STA such as one of the STAs 104 described with reference to FIG. 1.

At block 502, the process 500*b* includes receiving a BTM request indicating a subset of affiliated APs of an AP MLD, as described with respect to block 502 at process 500*a*.

At block 504, the process 500*b* includes selectively transmitting or refraining from transmission of a T2LM request frame to a network entity in response to the BTM request frame based on whether an association of a non-AP MLD with the subset of affiliated APs of the AP MLD is to be maintained, as described with respect to block 504 at process 500*a*.

Optionally, at block 510, the process 500*b* includes refraining from transmission of the T2LM request frame. One or more components of wireless communication device 200, 315 or of non-AP STA 104, 304 may constitute the means for refraining.

Optionally, at block 512, the process 500*b* includes receiving a disassociation frame based on a failure to transmit the T2LM request frame. One or more components of wireless communication device 200 or of non-AP STA 104, 304 may constitute the means for receiving. For example, referring to FIG. 7B, the non-AP STA 704 may receive a disassociation frame 732 from the AP STA 702 indicating a disassociation of the associated non-AP MLD including non-AP STA 704 from the AP MLD including AP 702. For example, referring to FIG. 7, the non-AP STA 704 receives a disassociation frame based on a failure to transmit the T2LM request frame.

FIG. 5C shows a flowchart illustrating an example process 500c for communications at a non-AP MLD (or a non-AP STA). Optional aspects are illustrated in dashed lines. The operations of the process 500c may be implemented by a wireless STA or its components as described herein. For example, the process 500c may be performed by a wireless communication device such as the wireless communication device 315 described with reference to FIG. 3B, operating as or within a wireless STA. In some examples, the process 500c may be performed by a wireless STA such as one of the STAs 104 described with reference to FIG. 1.

At block 502, the process 500c includes receiving a BTM request indicating a subset of affiliated APs of an AP MLD, as described with respect to block 502 at process 500a.

At block 504, the process 500c includes selectively transmitting or refraining from transmission of a T2LM request frame to a network entity in response to the BTM request frame based on whether an association of a non-AP MLD with the subset of affiliated APs of the AP MLD is to be maintained, as described with respect to block 504 at process 500a.

Optionally, at block 514, the process 500c includes receiving at least one T2LM request frame prior to reception of the BTM request frame. In some aspects, the BTM request frame may indicate that a disassociation of the associated non-AP MLD from the AP MLD occurs after a disassociation time period lapses. One or more components of wireless communication device 200, 315 or of non-AP STA 104, 304 may constitute the means for receiving.

FIG. 5D shows a flowchart illustrating an example process 500d for communications at a non-AP MLD (or a non-AP STA). Optional aspects are illustrated in dashed lines. The operations of the process 500d may be implemented by a wireless STA or its components as described herein. For example, the process 500d may be performed by a wireless communication device such as the wireless communication device 315 described with reference to FIG. 3B, operating as or within a wireless STA. In some examples, the process 500d may be performed by a wireless STA such as one of the STAs 104 described with reference to FIG. 1.

At block 502, the process 500d includes receiving a BTM request indicating a subset of affiliated APs of an AP MLD, as described with respect to block 502 at process 500a.

At block 504, the process 500d includes selectively transmitting or refraining from transmission of a T2LM request frame to a network entity in response to the BTM request frame based on whether an association of a non-AP MLD with the subset of affiliated APs of the AP MLD is to be maintained, as described with respect to block 504 at process 500a.

Optionally, at block 516, the process 500d includes receiving the BTM request frame in a broadcast. In some aspects, the BTM request frame may include one or more AIDs respectively for a plurality of network entities including the wireless communication device affiliated with the non-AP MLD. One or more components of wireless communication device 200, 315 or of non-AP STA 104, 304 may constitute the means for receiving.

In some aspects, the BTM request frame may include a reason code indicating a basis for disassociation of the associated non-AP MLD from the AP MLD.

In some aspects, the basis may be a failure in T2LM negotiations for load balancing between the AP MLD and the non-AP MLD.

FIG. 5E shows a flowchart illustrating an example process 500e for communications at a non-AP MLD (or a non-AP STA). Optional aspects are illustrated in dashed lines. The operations of the process 500e may be implemented by a wireless STA or its components as described herein. For example, the process 500e may be performed by a wireless communication device such as the wireless communication device 315 described with reference to FIG. 3B, operating as or within a wireless STA. In some examples, the process 500e may be performed by a wireless STA such as one of the STAs 104 described with reference to FIG. 1.

At block 502, the process 500e includes receiving a BTM request indicating a subset of affiliated APs of an AP MLD, as described with respect to block 502 at process 500a.

At block 504, the process 500e includes selectively transmitting or refraining from transmission of a T2LM request frame to a network entity in response to the BTM request frame based on whether an association of a non-AP MLD with the subset of affiliated APs of the AP MLD is to be maintained, as described with respect to block 504 at process 500a.

Optionally, at block 518, the process 500e may include receiving a T2LM request frame after reception of the BTM request frame. In some aspects, the BTM request frame may indicate that a disassociation of the associated non-AP MLD from the AP MLD occurs after a disassociation time period lapses. In some aspects, the BTM request frame may indicate that a disassociation of the associated non-AP MLD from the AP MLD does not occur after a disassociation time period lapses. One or more components of wireless communication device 200, 315 or of non-AP STA 104, 304 may constitute the means for receiving.

FIG. 5F shows a flowchart illustrating an example process 500f for communications at a non-AP MLD (or a non-AP STA). Optional aspects are illustrated in dashed lines. The operations of the process 500f may be implemented by a wireless STA or its components as described herein. For example, the process 500f may be performed by a wireless communication device such as the wireless communication device 315 described with reference to FIG. 3B, operating as or within a wireless STA. In some examples, the process 500f may be performed by a wireless STA such as one of the STAs 104 described with reference to FIG. 1.

At block 520, the process 500f includes receiving at least one T2LM request frame or at least one link recommendation frame prior to receipt of the BTM request frame, the BTM request frame indicating that a disassociation of the associated non-AP MLD from the AP MLD occurs after a disassociation time period lapses. In some aspects, the subset of affiliated APs in the BTM request frame match a proposed T2LM in the at least one T2LM request frame or a recommended set of links in the at least one link recommendation frame. In some aspects, the BTM request frame is received in response to a lack of acceptance of a proposed T2LM in the at least one T2LM request frame or a recommended set of links in the at least one link recommendation frame. For example, referring to FIG. 7D, the non-AP STA 704 receives at least one T2LM request frame prior to receipt of the BTM request frame.

At block 502, the process 500e includes receiving a BTM request indicating a subset of affiliated APs of an AP MLD, as described with respect to block 502 at process 500a.

At block 504, the process 500e includes selectively transmitting or refraining from transmission of a T2LM request frame to a network entity in response to the BTM request frame based on whether an association of a non-AP MLD with the subset of affiliated APs of the AP MLD is to be maintained, as described with respect to block 504 at process 500*a*.

In some aspects, the at least one T2LM request frame may indicate a proposed T2LM and is one of: a single T2LM request frame individually addressed to the network entity affiliated with the non-AP MLD, or a plurality of T2LM request frames transmitted via a broadcast respectively to a plurality of network entities affiliated with respective non-AP MLDs, including the network entity affiliated with the non-AP MLD. In some aspects, the at least one link recommendation frame may indicate a recommended set of links and is one of: a single link recommendation frame individually addressed to the network entity affiliated with the non-AP MLD, or a plurality of link recommendation frames transmitted via a broadcast respectively to a plurality of network entities affiliated with respective non-AP MLDs, including the network entity affiliated with the non-AP MLD.

FIG. 6 shows a flowchart illustrating an example process 600 for communications at one of the APs of an AP MLD according to some aspects. Optional aspects are illustrated in dashed lines. The operations of process 600 may be implemented by one of the APs of an AP MLD or its components as described herein. For example, the process 600 may be performed by a wireless communication device such as the wireless communication device 200, 310 described with reference to FIG. 2, 3A and/or the AP 102, 302 in FIGS. 1 and 3A (referred to throughout process 600 as the wireless communication device).

At block 602, the process 600 includes receiving an association request frame indicating a plurality of APs of a first AP MLD from a network entity in response to a BTM request frame indicating a subset of affiliated APs of the AP MLD, a source of the BTM request frame being affiliated with a different AP MLD than the AP MLD and a destination of the BTM request frame being the network entity. The wireless communication device is affiliated with the first AP MLD, and the network entity is a non-AP STA affiliated with a non-AP MLD. The source of the BTM request frame is affiliated with a second AP MLD different than the first AP MLD and a destination of the BTM request frame is the network entity. One or more components of wireless communication device 200, 310 or of AP 102, 302 may constitute the means for receiving. For example, in an aspect, the AP 302 may activate the WCD 310 to receive, using the antennas 320, the association request on a link between the AP 302 and the non-AP STA 304. As another example, referring to FIG. 7C, the first AP 702 may receive an association request frame 734 from the non-AP STA 704 requesting a multi-link setup with the first AP 702.

At block 604, the process 600 includes transmitting an association response frame in response to the association request frame. One or more components of wireless communication device 200, 310 or of AP 102, 302 may constitute the means for transmitting. For example, referring to FIG. 7C, the first AP 702 may transmit an association response frame 736 in response to receiving the association response frame from the non-AP STA 704.

At block 606, the process 600 includes receiving a traffic identifier (TID)-to-link mapping (T2LM) request from the network entity embedded within the association request frame, the T2LM request requesting a T2LM between the non-AP MLD and the subset of affiliated APs of the AP MLD indicated in the BTM request frame. One or more components of wireless communication device 200, 310 or of AP 102, 302 which constitute the means for receiving at block 602 may similarly constitute the means for receiving at block 606. For example, referring to FIG. 7C, the first AP 702 may receive the T2LM request 724 to operate on a subset of links of the AP MLD from the non-AP STA 704.

In some aspects, the network entity may be a non-AP station (STA) affiliated with the non-AP MLD.

In some aspects, the T2LM is requested by the associated non-AP MLD between the non-AP MLD and a subset of the subset of affiliated APs of the AP MLD indicated in the BTM request frame.

In some aspects, the T2LM is requested by the associated non-AP MLD between the non-AP MLD and a different subset of affiliated APs of the AP MLD than the subset of affiliated APs indicated in the BTM request frame.

Optionally, at block 608, the process 600 may include transmitting a T2LM response indicating the T2LM is successful in response to the T2LM request. One or more components of wireless communication device 200, 310 or of AP 102, 302 may constitute the means for transmitting. For example, referring to FIG. 7C, the first AP 702 may transmit a T2LM response indicating a successful T2LM 726 between its AP MLD and the non-AP MLD including the non-AP STA 704.

It is understood that the method illustrated by FIGS. 4A-6 are illustrative in nature and that the blocks or steps described herein may be combined to generate alternative implementations.

Figure 7A:
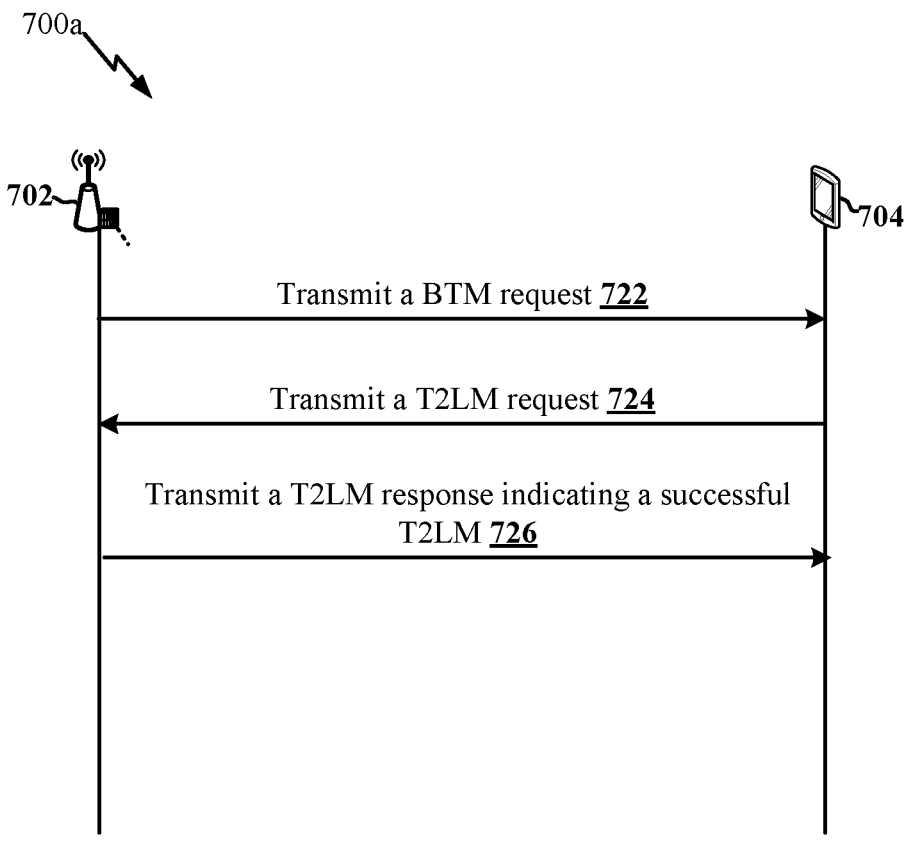
FIG. 7A shows a call flow diagram between an AP affiliated with an AP MLD and a client device (or non-AP STA) affiliated with a non-AP MLD that supports BTM-based load balancing.

FIG. 7A is a call flow diagram 700*a* between an AP 702 affiliated with an AP MLD and a client device (or a non-AP STA 704) affiliated with a non-AP MLD. The AP 702 may be configured to perform the process 400*a*, 400*b*, 400*c*, 400*d*, 400*e*, 400*f*, and 400*g* described above with respect to FIGS. 4A-4G, and the non-AP STA 704 may be configured to perform the process 500*a*, 500*b*, 500*c*, 500*d*, 500*e*, and 500*f* described above with respect to FIGS. 5A-5F. In one example, initially, the AP 702 may transmit a BTM request 722 to the non-AP STA 704 indicating a subset of affiliated APs affiliated with an AP MLD including AP 702. Following transmission of the BTM request, the non-AP STA 704 may transmit a T2LM request 724 to the AP 702 to operate on a subset of links of the AP MLD including the AP 702. In response to the transmission of the T2LM request, the AP 702 may transmit a T2LM response 726 indicating a successful T2LM between its AP MLD and the non-AP MLD including the non-AP STA 704.

Accordingly, in the scenario encompassed by FIG. 7A, an AP of a first AP MLD transmits a BTM request indicating APs other than itself with preferred APs. The non-AP MLD performs T2LM to the subset to the indicated AP set. The first AP MLD does not disassociate a non-AP MLD after time out since the T2LM response acts as an implicit indication that disassociation is aborted. For example, in the scenario encompassed by FIG. 7A, the AP MLD and the non-AP MLD may associate on three links (2.4 GHz, 5 GHz, 6 GHz), the BTM request then requests the non-AP MLD to subset to two links. In response, the non-AP MLD's T2LM subsets to two links to avoid disassociation.

Figure 7B:
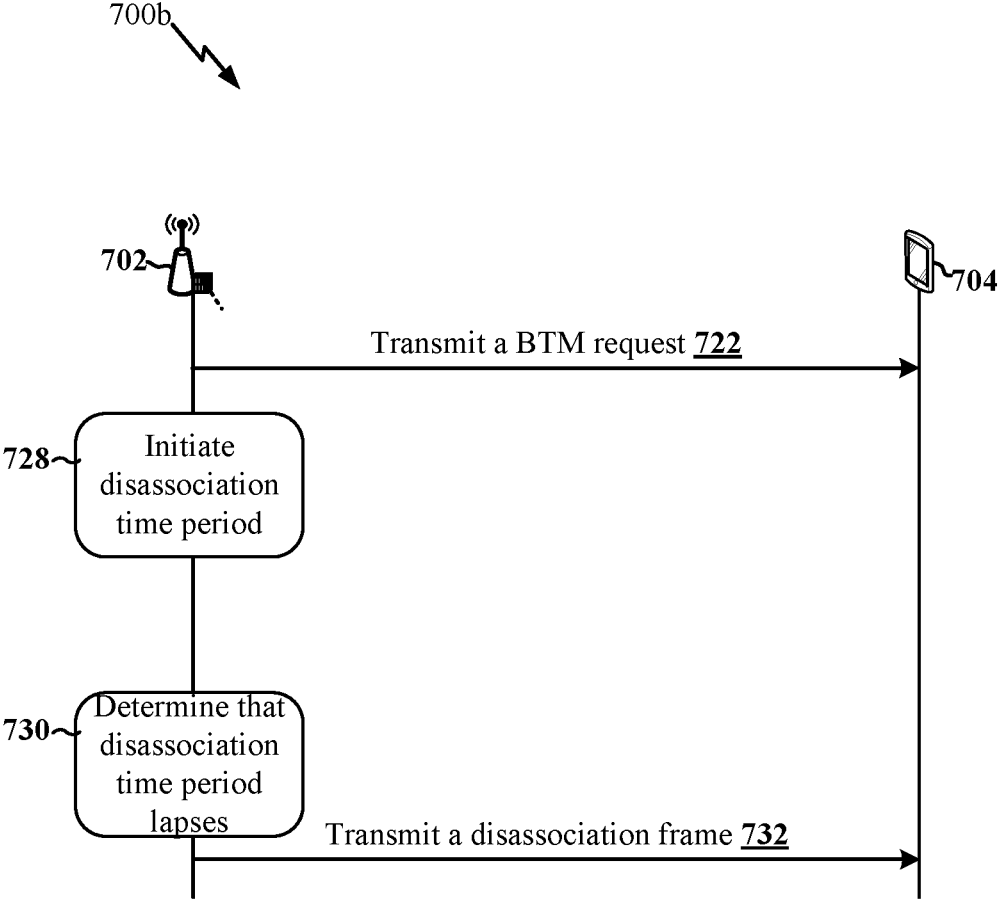
FIG. 7B shows a call flow diagram between an AP affiliated with an AP MLD and a client device (or non-AP STA) affiliated with a non-AP MLD that support BTM-based load balancing.

FIG. 7B is another call flow diagram 700*b* between an AP 702 affiliated with an AP MLD and a client device (or non-AP STA 704) affiliated with a non-AP MLD. The AP 702 may be configured to perform the process 400*a*, 400*b*, 400*c*, 400*d*, 400*e*, 400*f*, and 400*g* described above with respect to FIGS. 4A-4G, and the non-AP STA 704 may be configured to perform the process 500*a*, 500*b*, 500*c*, 500*d*, 500*e*, and 500*f* described above with respect to FIGS. 5A-5F. In one example, initially, the AP 702 may transmit a BTM request 722 to the non-AP STA 704 indicating a subset of affiliated APs affiliated with an AP MLD including AP 702. Following transmission of the BTM request, the disassociation time period indicated in the BTM request may be initiated 728. Once the disassociation time period lapses, the AP 702 may not receive a T2LM request from non-AP STA 704 to operate on a subset of links of the AP MLD including the AP 702. Thus, in response to the disassociation time period elapsing 730, the AP 702 may transmit a disassociation frame 732 to the non-AP STA 704 indicating a disassociation of the associated non-AP MLD including non-AP STA 704 from the AP MLD including AP 702 in response to the AP's failure to receive the T2LM request before the disassociation time period lapses.

Figure 7C:
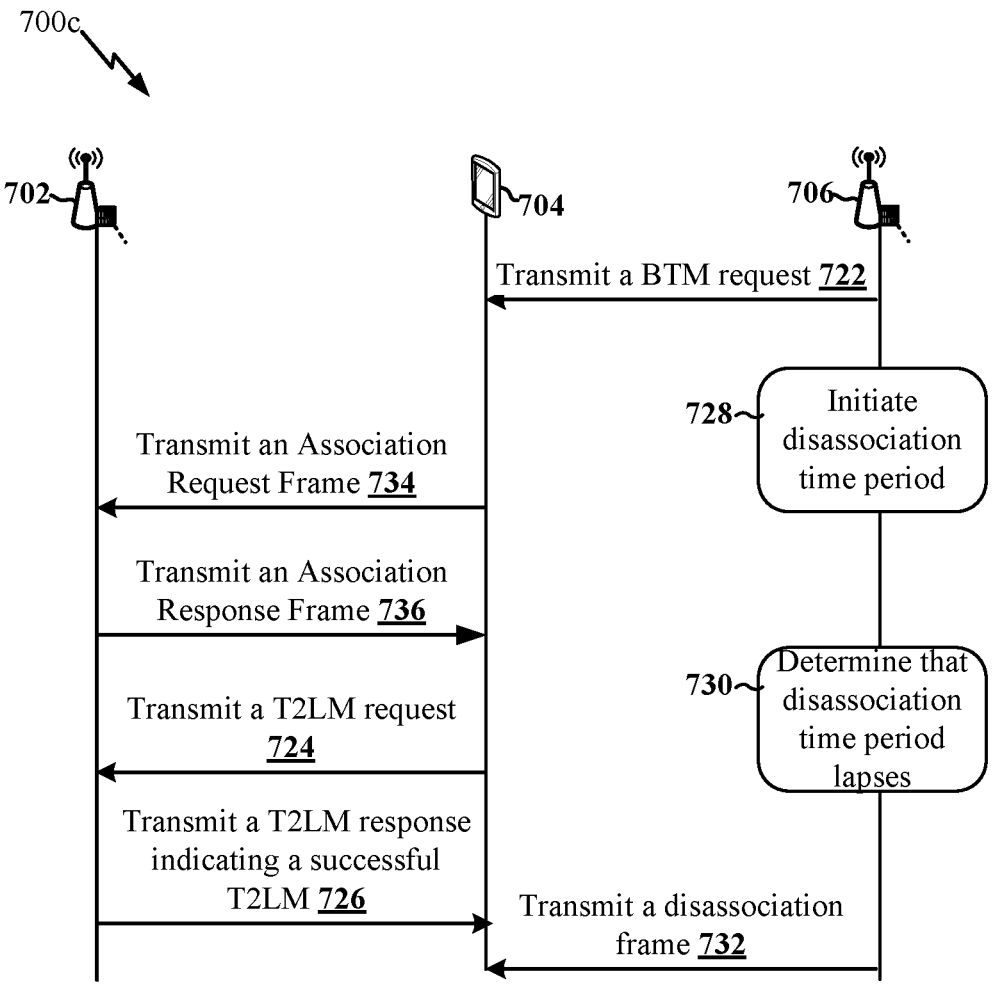
FIG. 7C shows a call flow diagram between a first AP affiliated with an AP MLD, a client device (or a non-AP STA) affiliated with a non-AP MLD, and a second AP affiliated with a different AP MLD that support BTM-based load balancing.

FIG. 7C is a call flow diagram 700c between a first AP 702 affiliated with an AP MLD, a client device (or a non-AP STA 704) affiliated with a non-AP MLD, and a second AP 706 affiliated with a different AP MLD. The first AP 702 may be configured to perform the process 600 described above with respect to FIG. 6, the non-AP STA 704 may be configured to perform the process 500a, 500b, 500c, 500d, 500e, and 500f described above with respect to FIGS. 5A-5F, and the second AP 706 may be configured to perform the process 400a, 400b, 400c, 400d, 400e, 400f, and 400g described above with respect to FIGS. 4A-4G. In one example, initially, the second AP 706 may transmit a BTM request 722 to the non-AP STA 704 indicating a subset of affiliated APs affiliated with an AP MLD including first AP 702. Following transmission of the BTM request, the disassociation time period indicated in the BTM request may be initiated 728. During this time period, the second AP 706 may not receive a T2LM request from non-AP STA 704 to operate on a subset of links of the AP MLD including the second AP 706. Thus, in response to the disassociation time period elapsing 730, the second AP 706 may transmit a disassociation frame 732 to the non-AP STA 704 indicating a disassociation of the associated non-AP MLD including non-AP STA 704 from the AP MLD including second AP 706 in response to the AP's failure to receive the T2LM request before the disassociation time period lapses.

Meanwhile, in response to the BTM request 722 indicating the AP MLD of first AP 702, the non-AP STA 704 may transmit an association request frame 734 to the first AP 702 requesting a multi-link (ML) setup with the first AP 702. After the first AP 702 receives the association request frame, the first AP 702 may transmit an association response frame 736 to the non-AP STA 704 confirming the multi-link setup. In response, the non-AP STA 704 may transmit the T2LM request 724 to the first AP 702 to operate on a subset of links of the AP MLD including the first AP 702. In response to the T2LM request 724, the first AP 702 may transmit the T2LM response indicating a successful T2LM 726 between its AP MLD and the non-AP MLD including the non-AP STA 704.

In the scenario encompassed by FIG. 7C, the AP MLD including second AP 706 disassociates with the non-AP MLD. The non-AP MLD is then encouraged to associate with the other AP MLD including the first AP 702 by requesting only the indicated APs as part of ML setup or by performing T2LM during ML setup while requesting a full set of links. The AP of a first AP MLD transmits a BTM request indicating a second AP MLD with indicated APs. The first AP MLD disassociates with the non-AP MLD after a time out. The non-AP MLD then performs ML setup with the second AP MLD by requesting links that the non-AP MLD may operate on and, during association, performs T2LM for the indicated subset of links. Therefore, the ML setup with the second AP MLD attempts the links that the non-AP MLD can support but T2LM meets the second AP MLD's requirements during association. The non-AP MLD may then seamlessly expand operations to include other links that were part of the ML setup with the second AP MLD.

Thus, in the scenario encompassed by FIG. 7C, the AP MLD is recommending another AP MLD (the second AP MLD) and a subset of its APs in the BTM request. In this case, the non-AP MLD performs a ML setup with the other AP requesting all the links while performing a T2LM subsetting during association with that other AP MLD. For example, the AP MLD and the non-AP MLD associates on three links (2.4 GHz, 5 GHz, 6 GHz). The BTM request then indicates a different AP MLD (operating on three links) and requests the non-AP MLD to perform MLD set for two specific links. The non-AP MLD performs a ML setup for all three links but, during ML setup (or association), the non-AP MLD also performs T2LM and subsets to two links. As a result, ML setup may be allowed with the other AP MLD for the three links and T2LM will do the subsetting during ML setup.

T2LM may be performed during association or post association. In the scenario of FIG. 7A, T2LM is performed post association so that the association context with the current AP may be maintained. In the scenario of FIG. 7C, association is extended to other AP MLD. As a result, the ML setup with the other AP MLD is for the links, and T2LM may later expand the operation to the three links.

Figure 7D:
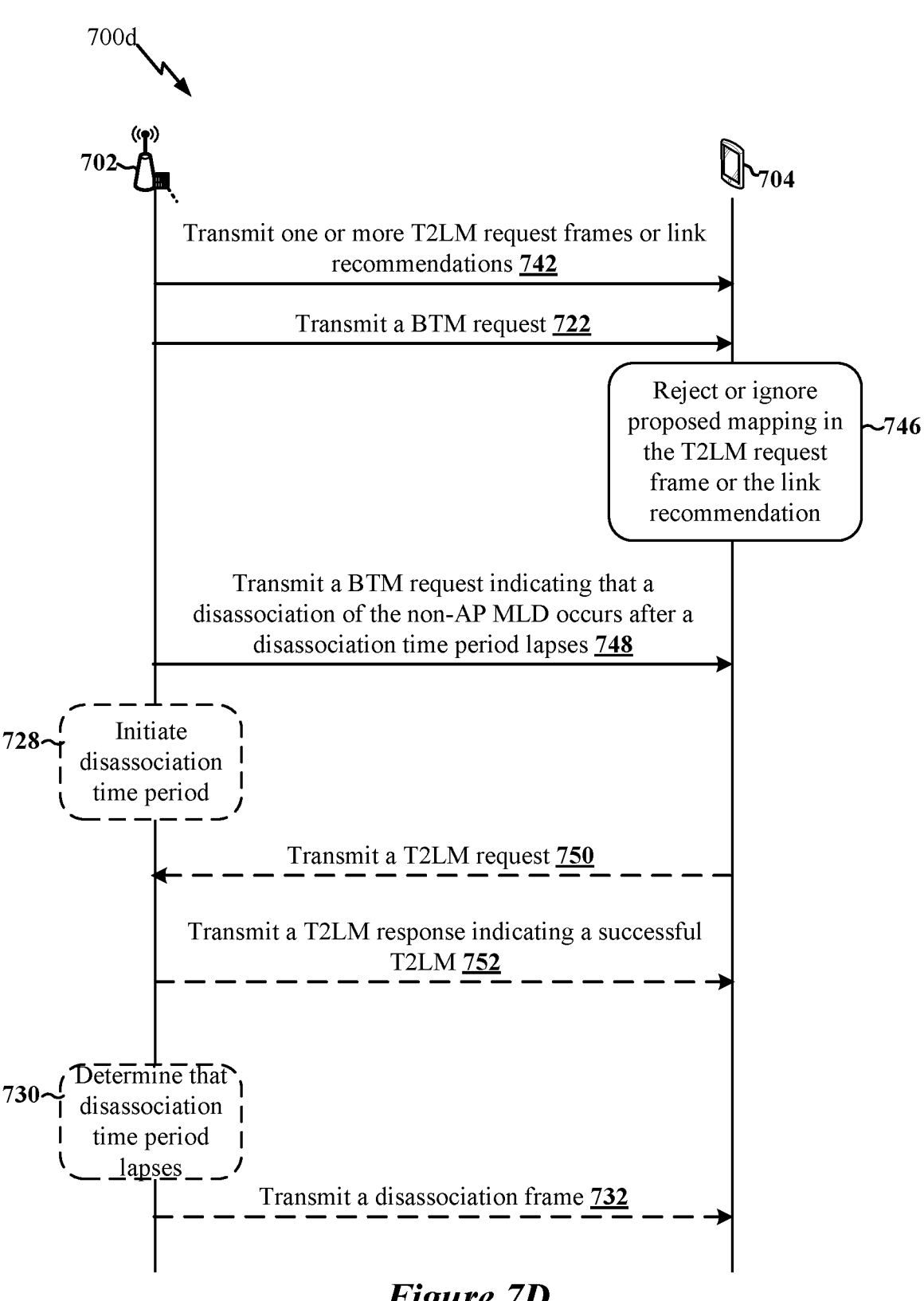
FIG. 7D shows a call flow diagram between an AP affiliated with an AP MLD and a client device (or non-AP STA) affiliated with a non-AP MLD that support BTM-based load balancing.

FIG. 7D is a call flow diagram 700d between an AP 702 affiliated with an AP MLD and a client device (or a non-AP STA 704) affiliated with a non-AP MLD. The AP 702 may be configured to perform the process 400a, 400b, 400c, 400d, 400e, 400f, and 400g described above with respect to FIGS. 4A-4G, and the non-AP STA 704 may be configured to perform the process 500a, 500b, 500c, 500d, 500e, and 500f described above with respect to FIGS. 5A-5F. In one example, the AP 702 may transmit at least one T2LM request frame or at least one link recommendation 742 to the non-AP STA 704. The AP 702 may then transmit a BTM request 722 to the non-AP STA 704 indicating a subset of affiliated APs affiliated with an AP MLD including AP 702. The subset of affiliated APs in the BTM request frame may match a proposed T2LM in the at least one T2LM request frame or a recommended set of links in the at least one link recommendation frame. Following transmission of the BTM request, the non-AP STA 704 may reject or ignore the proposed T2LM in the T2LM request frame or the recommendation in the at least one link recommendation frame 746.

In response to the AP's failure to receive the T2LM request from the non-AP STA 704, the AP 702 will transmit a BTM request 748 frame to the non-AP STA 704 indicating the subset of affiliated APs of an AP MLD along with an indication that disassociation of the associated non-AP MLD from the AP MLD will occur after a disassociation time period if the non-AP STA 704 does not comply. Following transmission of the BTM request, the disassociation time period indicated in the BTM request may be initiated 728.

In some aspects, in response to receiving the BTM request frame with a dissociation imminent indication to enforce the requested T2LM or link recommendation, the non-AP STA 704 from the AP MLD may accept the AP MLD's proposed mapping or recommendation and transmit a T2LM request 750 to the AP 702 to operate on the proposed mapping or recommendation of the subset of links of the AP MLD. In response, the AP 702 will transmit a T2LM response 752 indicating a successful T2LM between its AP MLD and the non-AP MLD including the non-AP STA 704.

In some other aspects, in response to receiving the BTM request frame with the dissociation imminent indication to enforce the requested T2LM or link recommendation, the non-AP STA 704 may continue to ignore or reject the proposed mapping in the T2LM request frame 742 or the recommendation in the at least one link recommendation frame. Thus, when the disassociation time period elapses 730, the AP 702 may transmit a disassociation frame 732 to the non-AP STA 704 indicating a disassociation of the associated non-AP MLD including non-AP STA 704 from the AP MLD including AP 702 in response to the AP's failure to receive the T2LM request from the non-AP STA 704 before the disassociation time period lapses.

Some Additional Examples

The aspects described herein additionally include one or more of the following implementation examples described in the following numbered clauses.
1. A wireless communication device, including:
at least one memory; and
at least one processor coupled with the at least one memory, the at least one processor operable to cause the wireless communication device to:
transmit a basic service set (BSS) transition management (BTM) request frame indicating a subset of access points (APs) of an AP multi-link device (AP MLD), the wireless communication device being affiliated with the AP MLD; and
selectively transmit or refrain from transmission of a disassociation frame indicating a disassociation of an associated non-AP multi-link device (non-AP MLD) from the AP MLD based at least in part on whether a traffic identifier (TID)-to-link mapping (T2LM) request frame is received from a network entity affiliated with the non-AP MLD in response to the BTM request frame, the T2LM request frame requesting a T2LM between the non-AP MLD and the AP MLD.
2. The wireless communication device of clause 1, where the network entity is a non-AP station (STA).
3. The wireless communication device of clauses 1 or 2, where the wireless communication device is one of the APs of the AP MLD.
4. The wireless communication device of any of the clauses 1 to 3, where the T2LM is requested between the non-AP MLD and the subset of affiliated APs of the AP MLD indicated in the BTM request frame.
5. The wireless communication device of any of the clauses 1 to 3, where the T2LM is requested between the non-AP MLD and a subset of the subset of affiliated APs of the AP MLD indicated in the BTM request frame.
6. The wireless communication device of any of the clauses 1 to 3, where the T2LM is requested between the non-AP MLD and a different subset of affiliated APs of the AP MLD than the subset of affiliated APs indicated in the BTM request frame.
7. The wireless communication device of any of the clauses 1 to 6, where the BTM request frame includes:
a disassociation imminent field indicating that a disassociation of the associated non-AP MLD from the AP MLD occurs after a disassociation time period lapses; and
a neighbor report element indicating the subset of affiliated APs of the AP MLD;

32 where the disassociation frame is selectively transmitted or refrained from transmission based on whether the T2LM request is received within the disassociation time period.
8. The wireless communication device of any of the clauses 1 to 7, where the processor is further configured to:
receive the T2LM request in response to the BTM request frame; and
where the at least one processor configured to selectively transmit or refrain from transmission of the disassociation frame is configured to:
refrain from transmission of the disassociation frame in response to the T2LM request frame.
9. The wireless communication device of clause 8, where the processor is further configured to transmit a T2LM response indicating a successful T2LM in response to the T2LM request frame.
10. The wireless communication device of clauses 8 or 9, wherein a multi-link setup and associated contexts between the AP MLD and the non-AP MLD are maintained in response to the T2LM request frame.
11. The wireless communication device of any of the clauses 1 to 7, wherein the BTM request frame indicates that a disassociation of the associated non-AP MLD from the AP MLD occurs after a disassociation time period lapses; and
where the at least one processor configured to selectively transmit or refrain from transmission of the disassociation frame is configured to:
transmit the disassociation frame in response to a failure to receive the T2LM request frame before the disassociation time period lapses.
12. The wireless communication device of any of the clauses 1 to 11, where the processor is further configured to:
transmit at least one T2LM request frame to the network entity affiliated with the non-AP MLD prior to transmission of the BTM request frame, the BTM request frame indicating that a disassociation of the associated non-AP MLD from the AP MLD occurs after a disassociation time period lapses.
13. The wireless communication device of any of the clauses 1 to 12, where the processor is further configured to:
transmit the BTM request frame in a broadcast, the BTM request frame including one or more association identifiers (AIDs) respectively for a plurality of network entities including the network entity affiliated with the non-AP MLD.
14. The wireless communication device of any of the clauses 1 to 13, where the BTM request frame includes a reason code indicating a basis for disassociation of the associated non-AP MLD from the AP MLD.
15. The wireless communication device of clause 14, where the basis is a failure in T2LM negotiations for load balancing between the AP MLD and the non-AP MLD.
16. The wireless communication device of any of the clauses 1 to 15, where the processor is further configured to:
transmit a T2LM request frame to the network entity affiliated with the non-AP MLD after transmission of the BTM request frame, the BTM request frame indicating that a disassociation of the associated non-AP MLD from the AP MLD occurs after a disassociation time period lapses.

17. The wireless communication device of any of the clauses 1 to 16, where the BTM request frame indicates that a disassociation of the associated non-AP MLD from the AP MLD does not occur after a disassociation time period lapses.

18. A wireless communication device, including:

at least one memory; and at least one processor coupled with the at least one memory, the at least one processor operable to cause the wireless device to:

receive a basic service set (BSS) transition management (BTM) request frame indicating a subset of access points (APs) of an AP multi-link device (AP MLD); and selectively transmit or refrain from transmission of a traffic identifier (TID)-to-link mapping (T2LM) request frame to a network entity in response to the BTM request frame based on whether an association of a non-AP multi-link device (non-AP MLD) with the subset of affiliated APs of the AP MLD is to be maintained, the wireless communication device being affiliated with the non-AP MLD, and the T2LM request frame requesting a T2LM between the non-AP MLD and the AP MLD.

19. The wireless communication device of clause 18, where the wireless communication device is a non-AP station (STA).

20. The wireless communication device of clauses 18 or 19, where the network entity is one of the APs of the AP MLD indicated in the BTM request frame.

21. The wireless communication device of clauses 18 or 19, where the BTM request frame is received from a different network entity affiliated with a different AP MLD than the AP MLD indicated in the BTM request frame.

22. The wireless communication device of any of the clauses 18 to 21, where the T2LM is requested between the non-AP MLD and the subset of affiliated APs of the AP MLD indicated in the BTM request frame.

23. The wireless communication device of any of the clauses 18 to 21, where the T2LM is requested between the non-AP MLD and a subset of the subset of affiliated APs of the AP MLD indicated in the BTM request frame.

24. The wireless communication device of any of the clauses 18 to 21, where the T2LM is requested between the non-AP MLD and a different subset of affiliated APs of the AP MLD than the subset of affiliated APs indicated in the BTM request frame.

25. The wireless communication device of any of the clauses 18 to 24, where the BTM request frame includes:

a disassociation imminent field indicating that a disassociation of the associated non-AP MLD from the AP MLD occurs after a disassociation time period lapses; and a neighbor report element indicating the subset of affiliated APs of the AP MLD;

where the T2LM request frame is transmitted within the disassociation time period.

26. The wireless communication device of any of the clauses 18 to 25, where the at least one processor configured to selectively transmit or refrain from transmission of the T2LM request frame is configured to:

transmit the T2LM request frame; and where the at least one processor is further configured to receive a T2LM response indicating the T2LM is successful in response to the T2LM request frame.

27. The wireless communication device of any of the clauses 18 to 26, where a multi-link setup and associated contexts between the AP MLD and the non-AP MLD are maintained in response to the T2LM request.

28. The wireless communication device of any of the clauses 18 to 25, where the at least one processor configured to selectively transmit or refrain from transmission of the T2LM request frame is configured to:

refrain from transmission of the T2LM request frame; and where the at least one processor is further configured to receive a disassociation frame based on a failure to transmit the T2LM request frame.

29. The wireless communication device of any of the clauses 18 to 28, where the processor is further configured to:

receive at least one T2LM request frame prior to reception of the BTM request frame, the BTM request frame indicating that a disassociation of the associated non-AP MLD from the AP MLD occurs after a disassociation time period lapses.

30. The wireless communication device of any of claims 18 to 29, where the processor is further configured to:

receive the BTM request frame in a broadcast, the BTM request frame including one or more association identifiers (AIDs) respectively for a plurality of network entities including the wireless communication device affiliated with the non-AP MLD.

31. The wireless communication device of any of the clauses 18 to 30, where the BTM request frame includes a reason code indicating a basis for disassociation of the associated non-AP MLD from the AP MLD.

32. The wireless communication device of the clauses 31, where the basis is a failure in T2LM negotiations for load balancing between the AP MLD and the non-AP MLD.

33. The wireless communication device of any of claims 18 to 32, where the processor is further configured to:

receive a T2LM request frame after reception of the BTM request frame, the BTM request frame indicating that a disassociation of the associated non-AP MLD from the AP MLD occurs after a disassociation time period lapses.

34. The wireless communication device of any of the clauses 18 to 24, where the BTM request frame indicates that a disassociation of the associated non-AP MLD from the AP MLD does not occur after a disassociation time period lapses.

35. A method for wireless communication performable at a first network entity, including:

transmitting a basic service set (BSS) transition management (BTM) request frame indicating a subset of access points (APs) of an AP multi-link device (AP MLD); and selectively transmitting or refraining from transmission of a disassociation frame indicating a disassociation of an associated non-AP multi-link device (non-AP MLD) from the AP MLD based at least in part on whether a traffic identifier (TID)-to-link mapping (T2LM) request frame is received from a second network entity affiliated with the non-AP MLD in response to the BTM request frame, the T2LM request frame requesting a T2LM between the non-AP MLD and the AP MLD.

36. The method of clause 35, further including one or more of the operations that the processor of the wireless communication device of any of claims 1 to 17 is configured to perform.

37. A method for wireless communication performable at a first network entity, including:

receiving a basic service set (BSS) transition management (BTM) request frame indicating a subset of access points (APs) of an AP multi-link device (AP MLD); and selectively transmitting or refraining from transmission of a traffic identifier (TID)-to-link mapping (T2LM) request frame to a second network entity in response to the BTM request frame based on whether an association of a non-AP multi-link device (non-AP MLD) with the subset of affiliated APs of the AP MLD is to be maintained, the first network entity being affiliated with the non-AP MLD, and the T2LM request frame requesting a T2LM between the non-AP MLD and the AP MLD.

38. The method of clause 37, further including one or more of the operations that the processor of the wireless communication device of any of claims 18 to 34 is configured to perform.

39. A wireless communication device, including:

means for transmitting a basic service set (BSS) transition management (BTM) request frame indicating a subset of access points (APs) of an AP multi-link device (AP MLD); and means for selectively transmitting or refraining from transmission of a disassociation frame indicating a disassociation of an associated non-AP multi-link device (non-AP MLD) from the AP MLD based at least in part on whether a traffic identifier (TID)-to-link mapping (T2LM) request frame is received from a network entity affiliated with the non-AP MLD in response to the BTM request frame, the T2LM request frame requesting a T2LM between the non-AP MLD and the AP MLD.

40. A wireless communication device, including:

means for receiving a basic service set (BSS) transition management (BTM) request frame indicating a subset of access points (APs) of an AP multi-link device (AP MLD); and means for selectively transmitting or refraining from transmission of a traffic identifier (TID)-to-link mapping (T2LM) request frame to a network entity in response to the BTM request frame based on whether an association of a non-AP multi-link device (non-AP MLD) with the subset of affiliated APs of the AP MLD is to be maintained, the wireless communication device being affiliated with the non-AP MLD, and the T2LM request frame requesting a T2LM between the non-AP MLD and the AP MLD.

41. A non-transitory computer-readable medium storing computer-executable code, the code when executed by a processor cause the processor to:

transmit a basic service set (BSS) transition management (BTM) request frame indicating a subset of access points (APs) of an AP multi-link device (AP MLD); and selectively transmit or refrain from transmission of a disassociation frame indicating a disassociation of an associated non-AP multi-link device (non-AP MLD) from the AP MLD based at least in part on whether a traffic identifier (TID)-to-link mapping (T2LM) request frame is received from a network entity affiliated with the non-AP MLD in response to the BTM request frame, the T2LM request frame requesting a T2LM between the non-AP MLD and the AP MLD.

42. A non-transitory computer-readable medium storing computer-executable code, the code when executed by a processor cause the processor to:

receive a basic service set (BSS) transition management (BTM) request frame indicating a subset of access points (APs) of an AP multi-link device (AP MLD); and selectively transmit or refrain from transmission of a traffic identifier (TID)-to-link mapping (T2LM) request frame to a first network entity in response to the BTM request frame based on whether an association of a non-AP multi-link device (non-AP MLD) with the subset of affiliated APs of the AP MLD is to be maintained, a second network entity including the processor being affiliated with the non-AP MLD, and the T2LM request frame requesting a T2LM between the non-AP MLD and the AP MLD.

43. A wireless communication device, including:

at least one memory; and at least one processor coupled to the memory, the at least one processor operable to cause the wireless communication device to:

receive an association request frame indicating a plurality of access points (APs) of an AP multi-link device (AP MLD) from a network entity in response to a basic service set (BSS) transition management (BTM) request frame indicating a subset of affiliated APs of the AP MLD, the wireless communication device being affiliated with the AP MLD, the network entity being affiliated with a non-AP MLD, a source of the BTM request frame being affiliated with a different AP MLD than the AP MLD and a destination of the BTM request frame being the network entity;

transmit an association response frame in response to the association request frame; and receive a traffic identifier (TID)-to-link mapping (T2LM) request from the network entity embedded within the association request frame, the T2LM request requesting a T2LM between the non-AP MLD and the subset of affiliated APs of the AP MLD indicated in the BTM request frame.

44. The wireless communication device of clause 43, where the network entity is a non-AP station (STA).

45. The wireless communication device of the clauses 43 or 44, where the T2LM is requested between the non-AP MLD and the subset of affiliated APs of the AP MLD indicated in the BTM request frame.

46. The wireless communication device of the clauses 43 or 44, where the T2LM is requested between the non-AP MLD and a subset of the subset of affiliated APs of the AP MLD indicated in the BTM request frame.

47. The wireless communication device of the clauses 43 or 44, where the T2LM is requested between the non-AP MLD and a different subset of affiliated APs of the AP MLD than the subset of affiliated APs indicated in the BTM request frame.

48. The wireless communication device of any of the clauses 43 to 47, where the at least one processor is further configured to transmit a T2LM response indicating the T2LM is successful in response to the T2LM request frame.

49. The wireless communication device of any of the clauses 43 to 48, where a multi-link setup between the AP MLD and the non-AP MLD is performed in response to the T2LM request.

50. A method for wireless communication performable at a first network entity, including:

receiving an association request frame indicating a plurality of access points (APs) of an AP multi-link device (AP MLD) from a second network entity in response to a basic service set (BSS) transition management (BTM) request frame indicating a subset of affiliated APs of the AP MLD, the first network entity being affiliated with the AP MLD, the second network entity being affiliated with a non-AP MLD, a source of the BTM request frame being affiliated with a different AP MLD than the AP MLD and a destination of the BTM request frame being the second network entity;

transmitting an association response frame in response to the association request frame; and receiving a traffic identifier (TID)-to-link mapping (T2LM) request from the second network entity embedded within the association request frame, the T2LM request requesting a T2LM between the non-AP MLD and the subset of affiliated APs of the AP MLD indicated in the BTM request frame.

51. The method of clause 50, further including one or more of the operations that the processor of the wireless communication device of any of claims 43 to 49 is configured to perform.

52. A wireless communication device, including:

means for receiving an association request frame indicating a plurality of access points (APs) of an AP multi-link device (AP MLD) from a network entity in response to a basic service set (BSS) transition management (BTM) request frame indicating a subset of affiliated APs of the AP MLD, the wireless communication device being affiliated with the AP MLD, the network entity being affiliated with a non-AP MLD, a source of the BTM request frame being affiliated with a different AP MLD than the AP MLD and a destination of the BTM request frame being the network entity;

means for transmitting an association response frame in response to the association request frame; and where the means for receiving is further configured to receive a traffic identifier (TID)-to-link mapping (T2LM) request from the network entity embedded within the association request frame, the T2LM request requesting a T2LM between the non-AP MLD and the subset of affiliated APs of the AP MLD indicated in the BTM request frame.

53. A non-transitory computer-readable medium storing computer-executable code, the code when executed by a processor cause the processor to:

receive an association request frame indicating a plurality of access points (APs) of an AP multi-link device (AP MLD) from a first network entity in response to a basic service set (BSS) transition management (BTM) request frame indicating a subset of affiliated APs of the AP MLD, a second network entity including the processor being affiliated with the AP MLD, the first network entity being affiliated with a non-AP MLD, a source of the BTM request frame being affiliated with a different AP MLD than the AP MLD and a destination of the BTM request frame being the first network entity;

transmit an association response frame in response to the association request frame; and receive a traffic identifier (TID)-to-link mapping (T2LM) request from the first network entity embedded within the association request frame, the T2LM request requesting a T2LM between the non-AP MLD and the subset of affiliated APs of the AP MLD indicated in the BTM request frame.

54. A wireless communication device, including:

at least one memory; and at least one processor coupled to the memory, the at least one processor operable to cause the wireless communication device to:

transmit a basic service set (BSS) transition management (BTM) request frame indicating a subset of access points (APs) of an AP multi-link device (AP MLD), the wireless communication device being affiliated with the AP MLD; and selectively transmit or refrain from transmission of a disassociation frame indicating a disassociation of an associated non-AP multi-link device (non-AP MLD) from the AP MLD based at least in part on whether a traffic identifier (TID)-to-link mapping (T2LM) request frame is received from a network entity affiliated with the non-AP MLD in response to the BTM request frame, the T2LM request frame requesting a T2LM between the non-AP MLD and the AP MLD.

55. The wireless communication device of clause 54, where the processor is further configured to:

transmit at least one T2LM request frame or at least one link recommendation to the network entity affiliated with the non-AP MLD prior to transmission of the BTM request frame, the BTM request frame indicating that a disassociation of the associated non-AP MLD from the AP MLD occurs after a disassociation time period lapses.

56. The wireless communication device of the clauses 54 or 55, where the subset of affiliated APs in the BTM request frame match a proposed T2LM in the at least one T2LM request frame or a recommended set of links in the at least one link recommendation frame.

57. The wireless communication device of the clauses 54 or 55, where the BTM request frame is transmitted in response to a lack of acceptance from the associated non-AP MLD of a proposed T2LM in the at least one T2LM request frame or a recommended set of links in the at least one link recommendation frame.

58. The wireless communication device of the clauses 54 or 55, where the at least one T2LM request frame indicates a proposed T2LM and is one of:

a single T2LM request frame individually addressed to the network entity affiliated with the non-AP MLD, or a plurality of T2LM request frames transmitted via a broadcast respectively to a plurality of network entities affiliated with respective non-AP MLDs, including the network entity affiliated with the non-AP MLD.

59. The wireless communication device of the clauses 54 or 55, where the at least one link recommendation frame indicates a recommended set of links and is one of:

a single link recommendation frame individually addressed to the network entity affiliated with the non-AP MLD, or a plurality of link recommendation frames transmitted via a broadcast respectively to a plurality of network entities affiliated with a respective non-AP MLDs, including the network entity affiliated with the non-AP MLD.

60. The wireless communication device of any of the clauses 54 to 59, where the T2LM is requested between the non-AP MLD and the subset of affiliated APs of the AP MLD indicated in the BTM request frame.

61. The wireless communication device of any of the clauses 54 to 60, where the T2LM is requested between the non-AP MLD and a subset of the subset of affiliated APs of the AP MLD indicated in the BTM request frame.

62. The wireless communication device of any of the clauses 54 to 61, where the BTM request frame indicates that a disassociation of the associated non-AP MLD from the AP MLD occurs after a disassociation time period lapses, where selectively transmitting or refraining from transmission of the disassociation frame includes transmitting the disassociation frame in response to a failure to receive the T2LM request frame before the disassociation time period lapses.

63. The wireless communication device of any of the clauses 54 to 62, where the processor is further configured to:

transmit the BTM request frame in a broadcast, the BTM request frame including one or more association identifiers (AIDs) respectively for a plurality of network entities including the network entity affiliated with the non-AP MLD.

64. The wireless communication device of any of the claims 54 to 63, where the BTM request frame is transmitted in response to a failure in T2LM negotiations for load balancing between the AP MLD and the non-AP MLD.

65. The wireless communication device of any of the clauses 54 to 64, where the processor is further configured to:

transmit a frame following the BTM request frame and indicating that the disassociation of the associated non-AP MLD from the AP MLD will not occur in response to the AP MLD receiving the T2LM request frame from the network entity affiliated with the non-AP MLD.

66. The wireless communication device of any of the clauses 54 to 65, where the frame indicating that the disassociation will not occur based on a T2LM response frame being transmitted in response to the T2LM request frame.

67. The wireless communication device of any of the clauses 54 to 66, where the network entity is a non-AP station (STA) and the wireless communication device is one of the APs of the AP MLD.

68. A method for wireless communication performable at a first network entity, including:

transmitting a basic service set (BSS) transition management (BTM) request frame indicating a subset of access points (APs) of an AP multi-link device (AP MLD); and selectively transmitting or refraining from transmitting a disassociation frame indicating a disassociation of an associated non-AP multi-link device (non-AP MLD) from the AP MLD based at least in part on whether a traffic identifier (TID)-to-link mapping (T2LM) request frame is received from a second network entity affiliated with the non-AP MLD in response to the BTM request frame, the T2LM request frame requesting a T2LM between the non-AP MLD and the AP MLD.

69. The method of clause 68, where the BTM request frame includes:

a disassociation imminent field indicating that a disassociation of the associated non-AP MLD from the AP MLD occurs after a disassociation time period lapses; and a neighbor report element indicating the subset of affiliated APs of the AP MLD, where the disassociation frame is selectively transmitted or refrained from transmission based on whether the T2LM request is received within the disassociation time period.

70. The method of clauses 68 or 69, further including:

receiving the T2LM request in response to the BTM request frame, where the selectively transmit or refrain from transmission of the disassociation frame further includes refraining from transmission of the disassociation frame in response to the T2LM request frame.

71. The method of any of the clauses 69 to 70, further including:

transmitting a T2LM response indicating one of a successful mapping, a rejection of received mapping, or an alternative mapping to the T2LM in response to the T2LM request frame.

72. The method of any of the clauses 69 to 71, where a multi-link setup and associated contexts between the AP MLD and the non-AP MLD are maintained in response to the T2LM request frame.

73. The method of any of the clauses 69 to 72, where the associated contexts include at least one of: an association identifier (AID) assigned to the non-AP MLD by the AP MLD during multi-link setup, a security context established during multi-link setup, or one or more block acknowledge context established between the AP MLD and the non-AP MLD.

74. A wireless communication device, including:

at least one memory; and at least one processor coupled to the memory, the at least one processor operable to cause the wireless communication device to:

receive a basic service set (BSS) transition management (BTM) request frame indicating a subset of access points (APs) of an AP multi-link device (AP MLD); and selectively transmit or refrain from transmission of a traffic identifier (TID)-to-link mapping (T2LM) request frame to a network entity in response to the BTM request frame based on whether an association of a non-AP multi-link device (non-AP MLD) with the subset of affiliated APs of the AP MLD is to be maintained, the wireless communication device being affiliated with the non-AP MLD, and the T2LM request frame requesting a T2LM between the non-AP MLD and the AP MLD.

75. The wireless communication device of clause 74, where the processor is further configured to:

receive at least one T2LM request frame or at least one link recommendation frame from the network entity prior to receipt of the BTM request frame, the BTM request frame indicating that a disassociation of the associated non-AP MLD from the AP MLD occurs after a disassociation time period lapses.

76. The wireless communication device of clauses 74 or 75, where the processor is further configured to:

receive at least one T2LM request frame or at least one link recommendation frame prior to receipt of the BTM request frame, the BTM request frame indicating that a disassociation of the associated non-AP MLD from the AP MLD occurs after a disassociation time period lapses 77. The wireless communication device of any of the clauses 74 to 76, where the subset of affiliated APs in the BTM request frame match a proposed T2LM in the at least one T2LM request frame or a recommended set of links in the at least one link recommendation frame.

78. The wireless communication device of any of the clauses 75 to 77, where the BTM request frame is received in response to a lack of acceptance of a proposed T2LM in the at least one T2LM request frame or a recommended set of links in the at least one link recommendation frame.

79. The wireless communication device of any of the clauses 74 to 78, where the at least one T2LM request frame indicates a proposed T2LM and is one of:

a single T2LM request frame individually addressed to the network entity affiliated with the non-AP MLD, or a plurality of T2LM request frames transmitted via a broadcast respectively to a plurality of network entities affiliated with respective non-AP MLDs, including the network entity affiliated with the non-AP MLD.

80. The wireless communication device of any of the clauses 74 to 79, where the at least one link recommendation frame indicates a recommended set of links and is one of:

a single link recommendation frame individually addressed to the network entity affiliated with the non-AP MLD, or a plurality of link recommendation frames transmitted via a broadcast respectively to a plurality of network entities affiliated with respective non-AP MLDs, including the network entity affiliated with the non-AP MLD.

81. A wireless communication device, including:

at least one memory; and at least one processor coupled to the memory, the at least one processor operable to cause the wireless communication device to:

receive an association request frame indicating a plurality of access points (APs) of a first AP multi-link device (AP MLD) from a network entity in response to a basic service set (BSS) transition management (BTM) request frame indicating a subset of affiliated APs of the first AP MLD, the wireless communication device being affiliated with the first AP MLD, the network entity being affiliated with a non-AP MLD, a source of the BTM request frame being affiliated with a second AP MLD different than the first AP MLD and a destination of the BTM request frame being the network entity;

transmit an association response frame in response to the association request frame; and receive a traffic identifier (TID)-to-link mapping (T2LM) request from the network entity embedded within the association request frame, the T2LM request requesting a T2LM between the non-AP MLD and the subset of affiliated APs of the first AP MLD indicated in the BTM request frame 82. The wireless communication device of clause 81, where the T2LM is requested by the associated non-AP MLD between the non-AP MLD and a subset of the subset of affiliated APs of the first AP MLD indicated in the BTM request frame.

83. The wireless communication device of clauses 81 or 82, where the T2LM is requested by the associated non-AP MLD between the non-AP MLD and a different subset of affiliated APs of the first AP MLD than the subset of affiliated APs indicated in the BTM request frame.

84. The wireless communication device of any of the clauses 81 to 83, where a T2LM response is embedded within the association response frame transmitted in response to the association request frame.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram.

However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless communication device, comprising:
at least one memory; and
at least one processor coupled with the at least one memory, the at least one processor operable to cause the wireless communication device to:
transmit a basic service set (BSS) transition management (BTM) request frame indicating a subset of affiliated access points (APs) of an AP multi-link device (AP MLD), the wireless communication device being affiliated with the AP MLD; and
selectively transmit or refrain from transmission of a disassociation frame indicating a disassociation of an associated non-AP multi-link device (non-AP MLD) from the AP MLD based at least in part on whether a traffic identifier (TID)-to-link mapping (T2LM) request frame is received from a network entity affiliated with the associated non-AP MLD in response to the BTM request frame, the T2LM request frame requesting a T2LM between the associated non-AP MLD and the AP MLD.

2. The wireless communication device of claim 1, wherein the network entity is a non-AP station (STA) and the wireless communication device is one of the APs of the AP MLD.

3. The wireless communication device of claim 1, wherein the processor is further configured to:
transmit at least one T2LM request frame or at least one link recommendation to the network entity affiliated with the associated non-AP MLD prior to transmission of the BTM request frame, the BTM request frame indicating that a disassociation of the associated non-AP MLD from the AP MLD occurs after a disassociation time period lapses.

4. The wireless communication device of claim 3, wherein the subset of affiliated APs in the BTM request frame match a proposed T2LM in the at least one T2LM request frame or a recommended set of links in the at least one link recommendation frame.

5. The wireless communication device of claim 3, wherein the BTM request frame is transmitted in response to a lack of acceptance from the associated non-AP MLD of a proposed T2LM in the at least one T2LM request frame or a recommended set of links in the at least one link recommendation frame.

6. The wireless communication device of claim 3, wherein the at least one T2LM request frame indicates a proposed T2LM and is one of:
a single T2LM request frame individually addressed to the network entity affiliated with the non-AP MLD, or
a plurality of T2LM request frames transmitted via a broadcast respectively to a plurality of network entities affiliated with respective non-AP MLDs, including the network entity affiliated with the non-AP MLD.

7. The wireless communication device of claim 3, wherein the at least one link recommendation frame indicates a recommended set of links and is one of:
a single link recommendation frame individually addressed to the network entity affiliated with the associated non-AP MLD, or
a plurality of link recommendation frames transmitted via a broadcast respectively to a plurality of network entities affiliated with a respective non-AP MLDs, including the network entity affiliated with the associated non-AP MLD.

8. The wireless communication device of claim 1, wherein the T2LM is requested by the associated non-AP MLD between the non-AP MLD and the subset of affiliated APs of the AP MLD indicated in the BTM request frame.

9. The wireless communication device of claim 1, wherein the T2LM is requested by the associated non-AP MLD between the non-AP MLD and a subset of the subset of affiliated APs of the AP MLD indicated in the BTM request frame.

10. The wireless communication device of claim 1, wherein the BTM request frame indicates that a disassociation of the associated non-AP MLD from the AP MLD occurs after a disassociation time period lapses,
wherein selectively transmitting or refraining from transmission of the disassociation frame comprises transmitting the disassociation frame in response to a failure to receive the T2LM request frame before the disassociation time period lapses.

11. The wireless communication device of claim 1, wherein the processor is further configured to:
transmit the BTM request frame in a broadcast, the BTM request frame including one or more association identifiers (AIDs) respectively for a plurality of network entities including the network entity affiliated with the associated non-AP MLD.

12. The wireless communication device of claim 1, wherein the BTM request frame is transmitted in response to a failure in T2LM negotiations for load balancing between the AP MLD and the associated non-AP MLD.

13. The wireless communication device of claim 1, wherein the processor is further configured to:
transmit a frame following the BTM request frame and indicating that the disassociation of the associated non-AP MLD from the AP MLD will not occur in response to the AP MLD receiving the T2LM request frame from the network entity affiliated with the associated non-AP MLD.

14. The wireless communication device of claim 13, wherein the frame indicating that the disassociation will not occur based on a T2LM response frame being transmitted in response to the T2LM request frame.

15. A method for wireless communication performable a first network entity, comprising:
transmitting a basic service set (BSS) transition management (BTM) request frame indicating a subset of affiliated access points (APs) of an AP multi-link device (AP MLD); and
selectively transmitting or refraining from transmitting a disassociation frame indicating a disassociation of an associated non-AP multi-link device (non-AP MLD) from the AP MLD based at least in part on whether a traffic identifier (TID)-to-link mapping (T2LM) request frame is received from a second network entity affiliated with the associated non-AP MLD in response to the BTM request frame, the T2LM request frame requesting a T2LM between the associated non-AP MLD and the AP MLD.

16. The method of claim 15, wherein the BTM request frame comprises:

a disassociation imminent field indicating that a disassociation of the associated non-AP MLD from the AP MLD occurs after a disassociation time period lapses; and a neighbor report element indicating the subset of affiliated APs of the AP MLD;

wherein the disassociation frame is selectively transmitted or refrained from transmission based on whether the T2LM request is received within the disassociation time period.

17. The method of claim 15, further comprising:

receiving the T2LM request in response to the BTM request frame, wherein the selectively transmit or refrain from transmission of the disassociation frame further comprises refraining from transmission of the disassociation frame in response to the T2LM request frame.

18. The method of claim 17, further comprising:

transmitting a T2LM response indicating one of a successful mapping, a rejection of received mapping, or an alternative mapping to the T2LM in response to the T2LM request frame.

19. The method of claim 18, wherein a multi-link setup and associated contexts between the AP MLD and the associated non-AP MLD are maintained in response to the T2LM request frame.

20. The method of claim 19, wherein the associated contexts include at least one of: an association identifier (AID) assigned to the associated non-AP MLD by the AP MLD during multi-link setup, a security context established during multi-link setup, or one or more block acknowledge context established between the AP MLD and the associated non-AP MLD.

21. A wireless communication device, comprising:

at least one memory; and at least one processor coupled with the at least one memory, the at least one processor operable to cause the wireless communication device to:

receive a basic service set (BSS) transition management (BTM) request frame indicating a subset of affiliated access points (APs) of an AP multi-link device (AP MLD); and selectively transmit or refrain from transmission of a traffic identifier (TID)-to-link mapping (T2LM) request frame to a network entity in response to the BTM request frame based on whether an association of a non-AP multi-link device (non-AP MLD) with the subset of affiliated APs of the AP MLD is to be maintained, the wireless communication device being affiliated with the non-AP MLD, and the T2LM request frame requesting a T2LM between the non-AP MLD and the AP MLD.

22. The wireless communication device of claim 21, wherein the processor is further configured to:

receive at least one T2LM request frame or at least one link recommendation frame prior to receipt of the BTM request frame, the BTM request frame indicating that a disassociation of the associated non-AP MLD from the AP MLD occurs after a disassociation time period lapses.

23. The wireless communication device of claim 22, wherein the subset of affiliated APs in the BTM request frame match a proposed T2LM in the at least one T2LM request frame or a recommended set of links in the at least one link recommendation frame.

24. The wireless communication device of claim 22, wherein the BTM request frame is received in response to a lack of acceptance of a proposed T2LM in the at least one T2LM request frame or a recommended set of links in the at least one link recommendation frame.

25. The wireless communication device of claim 22, wherein the at least one T2LM request frame indicates a proposed T2LM and is one of:

a single T2LM request frame individually addressed to the network entity affiliated with the non-AP MLD, or a plurality of T2LM request frames transmitted via a broadcast respectively to a plurality of network entities affiliated with respective non-AP MLDs, including the network entity affiliated with the non-AP MLD.

26. The wireless communication device of claim 22, wherein the at least one link recommendation frame indicates a recommended set of links and is one of:

a single link recommendation frame individually addressed to the network entity affiliated with the non-AP MLD, or a plurality of link recommendation frames transmitted via a broadcast respectively to a plurality of network entities affiliated with respective non-AP MLDs, including the network entity affiliated with the non-AP MLD.

27. A wireless communication device, comprising:

at least one memory; and at least one processor coupled with the at least one memory, the at least one processor operable to cause the wireless communication device to:

receive an association request frame indicating a plurality of access points (APs) of a first AP multi-link device (AP MLD) from a network entity in response to a basic service set (BSS) transition management (BTM) request frame indicating a subset of affiliated APs of the first AP MLD, the wireless communication device being affiliated with the first AP MLD, the network entity being affiliated with a non-AP MLD, a source of the BTM request frame being affiliated with a second AP MLD different than the first AP MLD and a destination of the BTM request frame being the network entity;

transmit an association response frame in response to the association request frame; and receive a traffic identifier (TID)-to-link mapping (T2LM) request from the network entity embedded within the association request frame, the T2LM request requesting a T2LM between the non-AP MLD and the subset of affiliated APs of the first AP MLD indicated in the BTM request frame.

28. The wireless communication device of claim 27, wherein the T2LM is requested between the non-AP MLD and a subset of the subset of affiliated APs of the first AP MLD indicated in the BTM request frame.

29. The wireless communication device of claim 27, wherein the T2LM is requested between the non-AP MLD and a different subset of affiliated APs of the first AP MLD than the subset of affiliated APs indicated in the BTM request frame.

30. The wireless communication device of claim 28, wherein a T2LM response is embedded within the association response frame transmitted in response to the association request frame.

* * * * *